United States Patent
Matsumura et al.

(10) Patent No.: US 9,990,155 B2
(45) Date of Patent: Jun. 5, 2018

(54) STORAGE CONTROL DEVICE, STORAGE SYSTEM AND METHOD OF CONTROLLING A STORAGE DEVICE

(71) Applicant: FUJITSU LIMITED, Kawasaki-shi, Kanagawa (JP)

(72) Inventors: Tadashi Matsumura, Kawasaki (JP); Tomohiko Muroyama, Yokohama (JP); Motoki Sotani, Fuchu (JP); Noriyuki Yasu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 15/099,970

(22) Filed: Apr. 15, 2016

(65) Prior Publication Data

US 2016/0321006 A1 Nov. 3, 2016

(30) Foreign Application Priority Data

Apr. 30, 2015 (JP) .................................. 2015-093347

(51) Int. Cl.
*G06F 3/06* (2006.01)
*G06F 1/32* (2006.01)

(52) U.S. Cl.
CPC .......... *G06F 3/0634* (2013.01); *G06F 1/3268* (2013.01); *G06F 3/065* (2013.01);
(Continued)

(58) Field of Classification Search
CPC ............................ G06F 3/0625; G06F 3/0634
See application file for complete search history.

(56) References Cited

U.S. PATENT DOCUMENTS 8,527,626 B1 * 9/2013 Wang ...................... G06F 3/061
709/224
9,182,917 B1 * 11/2015 Wu ........................ G06F 3/0689
(Continued)

FOREIGN PATENT DOCUMENTS

JP 2011-238038 11/2011
JP 2013-206009 10/2013

OTHER PUBLICATIONS

Archlinux, [solved] Hard drives continually spinning up (smartd polling?), archlinux, Jun. 26, 2014, available at: https://bbs.archlinux.org/viewtopic.php?id=183419.*
(Continued)

*Primary Examiner* — Prasith Thammavong
*Assistant Examiner* — Edmund H Kwong
(74) *Attorney, Agent, or Firm* — Staas & Halsey LLP

(57) ABSTRACT

A storage control device configured to be coupled to a storage device including a first portion and a second portion, the storage control device includes a memory, and a processor configured to control an operation mode of the first portion of the storage device to be in a first mode and a second mode, a first power consumed by the first portion in the first mode being less than a second power consumed by the first portion in the second mode, set the operation mode of the first portion in the first mode, receive a first request, determine whether the received first request is a polling access request, and when the received first request is the polling access request, keep the operation mode of the first portion in the first mode, and read first data from the second portion.

18 Claims, 17 Drawing Sheets

(52) U.S. Cl.
CPC .......... *G06F 3/0625* (2013.01); *G06F 3/0685* (2013.01); *Y02B 60/1246* (2013.01)

(56) References Cited

U.S. PATENT DOCUMENTS 9,514,162 B2 * 12/2016 Bertram ............ G06F 17/30289
2011/0283063 A1 * 11/2011 Takiyanagi ........... G06F 3/0625
711/114

OTHER PUBLICATIONS

Ubuntu manuals, zesty (8) laptop-mode.conf.8.gz, 2010, available at: http://manpages.ubuntu.com/manpages/zesty/man8/laptop-mode.conf.8.html.*

* cited by examiner

FIG. 4

| ENTRY | ENTRY INFORMATION | |
| --- | --- | --- |
| | MEMBER | CONTENT |
| ENTRY #1 | SERVER | 0x5000AAA |
| | LUN | 0x0001 |
| | LUN ADDRESS | 0xFFFFFFFFFFFFFFFF |
| | DATA SIZE | 0xFFFFFFFFFFFFFFFF |
| | FINAL ACCESS TIME | 2015/01/01 00:00:00 |
| | MONITORING STATUS | 0x00 (BEFORE BEING MONITORED) |
| | POLLING I/O DETERMINATION RESULT | 0x00 (N/A) |
| | POLLING I/O ATTRIBUTE | 0x00 (N/A) |
| | POLLING I/O ACCESS TIME (LATEST) | 1900/01/01 00:00:00 |
| | POLLING I/O ACCESS TIME (PREVIOUS) | 1900/01/01 00:00:00 |
| | POLLING I/O INTERVAL | 00:00:00 |
| | POLLING I/O RECEPTION COUNTER | 0x00 (0 TIMES) |
| | ALTERNATIVE DESTINATION | 0x00, 0xFFFF (N/A) |
| | ALTERNATIVE DESTINATION ADDRESS | 0xFFFFFFFFFFFF |
| ENTRY #2 | ⋮ | ⋮ |
| ENTRY #3 | ⋮ | ⋮ |
| ⋮ | ⋮ | ⋮ |

STORAGE CONTROL DEVICE, STORAGE SYSTEM AND METHOD OF CONTROLLING A STORAGE DEVICE

CROSS-REFERENCE TO RELATED APPLICATION

This application is based upon and claims the benefit of priority of the prior Japanese Patent Application No. 2015-093347, filed on Apr. 30, 2015, the entire contents of which are incorporated herein by reference.

FIELD

The embodiments discussed herein are related to a storage control device, a storage system and a method of controlling a storage device.

BACKGROUND

There is widely used a disk array that makes memory devices (hard disk drives (HDD), solid state drives (SSDs), or the like) redundant by using a redundant arrays of inexpensive disks (RAID) technology or the like and that realizes high-speed data access and enlargement of capacity. On the other hand, if the number of the memory devices is increased in order to increase the capacity of a disk array, the amount of electric power consumed by the disk array is increased. Therefore, from the viewpoint of reducing a running cost or an environmental load, research and development regarding power saving of a disk array have been advanced.

As a technology for power saving of a disk array, there is, for example, a massive array of idle disks (MAID) technology. The MAID technology is a technology for reducing power consumption by causing a memory device to make a transition to a power saving mode (for example, reduction or stopping of the number of rotations of a disk, retracting of a disk head, power-off, or the like), in which the memory device is included in the disk array and no data access to the memory device is generated. In a case where a data access to a memory device in a state of the power saving mode is generated, a controller to control memory devices restores, to a normal operation mode, the memory device subjected to the data access.

If a time period for maintaining a memory device in a state of the power saving mode is long, an effect for suppressing power consumption is increased by an amount corresponding thereto. Therefore, in a case where the data access to the memory device in a state of the power saving mode is generated, possibility of normally processing the data access while not restoring the memory device to the normal operation mode contributes to further power saving.

Note that there is proposed a technology for providing an SSD in a disk array including HDDs and writing data into the SSD in a case where a write request to an HDD whose rotation of a disk is stopped is received from a host computer. If a status of writing data into the SSD satisfies a given condition, this disk array rotates the disk of the corresponding HDD and transfers data of the SSD to the HDD. In addition, there is proposed a technology for writing data into an HDD in a case where another inactive HDD included in HDDs configuring a RAID is requested to write.

As examples of the related art, Japanese Laid-open Patent Publication No. 2013-206009 and Japanese Laid-open Patent Publication No. 2011-238038 are known.

SUMMARY

According to an aspect of the invention, a storage control device configured to be coupled to a storage device including a first portion and a second portion, the storage control device includes a memory, and at least one processor coupled to the memory and configured to control an operation mode of the first portion of the storage device to be in a first mode and a second mode, a first power consumed by the first portion in the first mode being less than a second power consumed by the first portion in the second mode, set the operation mode of the first portion in the first mode, after the operation mode of the first portion is set in the first mode, receive a first request, determine whether the received first request is a polling access request for monitoring the storage device, and when the received first request is the polling access request, keep the operation mode of the first portion in the first mode, and read first data from the second portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a polling I/O management table according to the second embodiment;

DESCRIPTION OF EMBODIMENTS

A schedule for setting a power saving mode is fixed in accordance with, for example, the purpose, the operating policy, or the like of a storage system including a disk array. In a case of, for example, a storage system used for backup, a setting schedule may be fixed in accordance with an implementation time zone of a backup operation so that memory devices excluded from implementation are put into the power saving mode. In such a system, based on a preliminarily fixed setting schedule, an operation mode is controlled, thereby enabling power consumption to be efficiently suppressed.

In this regard, however, if an unscheduled data access is generated, processing for restoring a memory device serving as a data-access target to the normal operation mode is caused. Therefore, if it is possible to reduce a chance that such restoration processing is caused, it is possible to more efficiently suppress power consumption. Unscheduled data accesses include, for example, a data access performed by an operating system (OS), a specific application program, or the like of a higher-level device in order to perform device diagnostics.

Such a data access aimed at monitoring is not aimed mainly at writing or reading data into or from a memory device. Therefore, in many cases, a memory device in a state of the power saving mode does not have to go so far as to be immediately restored to the normal operation mode in order to be performed. Therefore, if it becomes possible to correctly respond to the data access aimed at monitoring while not restoring the memory device in a state of the power saving mode to the normal operation mode, it becomes possible to more efficiently suppress power consumption.

Hereinafter, embodiments of the present technology will be described with reference to accompanying drawings. Note that, in some cases, a same symbol will be assigned to an element having a practically-same function in the specification and drawings, thereby omitting redundant description.

<1. First Embodiment>

A first embodiment will be described with reference to FIG. 1.

The first embodiment is related to a power-saving technology for a storage system and provides a method for enabling to correctly respond to a data access, aimed at monitoring, while not restoring a memory device in a state of a power saving mode to a normal operation mode. According to the first embodiment, it becomes possible to more efficiently suppress power consumption. Note that FIG. 1 illustrates an example of a storage system according to the first embodiment. A storage system 5 exemplified in FIG. 1 is an example of the storage system according to the first embodiment.

Figure 1:
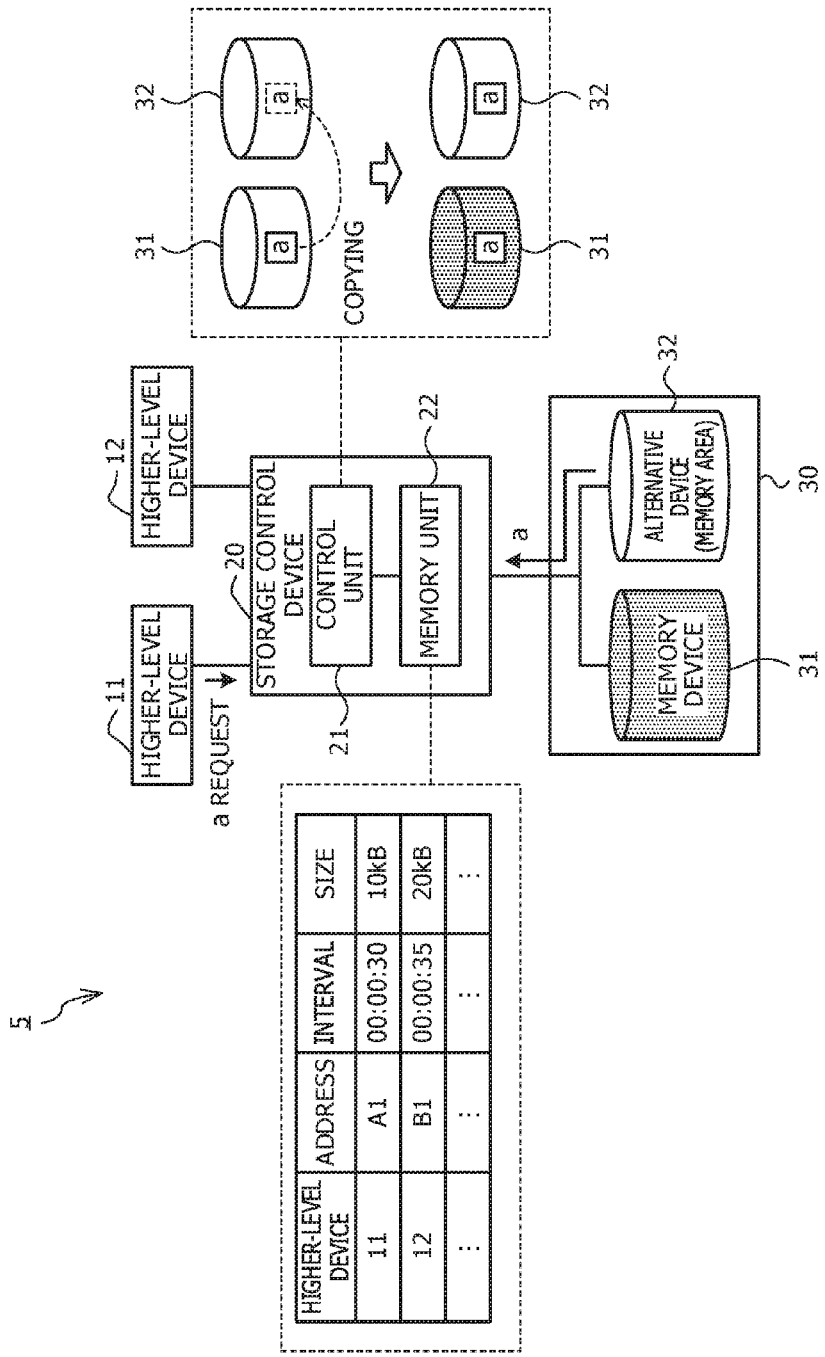
FIG. 1 illustrates an example of a storage system according to a first embodiment.

As illustrated in FIG. 1, the storage system 5 includes higher-level devices 11 and 12, a storage control device 20, and a storage device 30. The higher-level devices 11 and 12 are computers such as, for example, server devices. The storage control device 20 is a computer that controls a data access to the storage device 30 and an operation of the storage device 30. The storage device 30 is, for example, a disk array that stores therein data. The storage device 30 includes a memory device 31 and an alternative device 32.

The memory device 31 is a RAID device obtained by, for example, making redundant HDDs by using a RAID technology. The alternative device 32 is a volatile memory device such as, for example, a random access memory (RAM) or a non-volatile memory device such as, for example, an HDD or a flash memory. In addition, the alternative device 32 may be a RAID device obtained by making redundant HDDs in the same way as in the memory device 31.

The higher-level devices 11 and 12 each request the storage control device 20 to write or read data into or from the storage device 30. The storage control device 20 accesses the storage device 30 in response to a request from the higher-level device 11 or 12 and responds to the request from the higher-level device 11 or 12.

In a case of receiving a write request from, for example, the higher-level device 11, the storage control device 20 writes requested data into the storage device 30 and notifies the higher-level device 11 of completion of the writing. In a case of receiving a read request from the higher-level device 11, the storage control device 20 reads and transfers requested data from the storage device 30 and to the higher-level device 11.

The storage control device 20 includes a control unit 21 and a memory unit 22. Such responses to the write request and the read request as described above are performed by the control unit 21.

Note that the control unit 21 is a processor such as a central processing unit (CPU) or a digital signal processor (DSP). In this regard, however, the control unit 21 may be an electronic circuit such as an application specific integrated circuit (ASIC) or a field programmable gate array (FPGA). The control unit 21 executes a program stored in, for example, the memory unit 22 or another memory. The memory unit 22 is a volatile memory device such as a RAM or a non-volatile memory device such as an HDD or a flash memory.

In addition, the control unit 21 controls the operation mode of the memory device 31 settable to the power saving mode. In the power saving mode, control operations such as, for example, reduction or stopping of the number of rotations of a disk, retracting of a disk head, power-off, and so forth are performed. In the example of FIG. 1, the memory device 31 is set to the power saving mode. In this case, the control unit 21 copies data "a" into a memory area (for example, the alternative device 32) different from the memory device 31, the data a being included in data stored in the memory device 31 and being sent as a response at the time of being requested to be accessed in order to monitor the memory device 31.

The above-mentioned access for monitoring is a data access performed on the memory device 31 in processing such as, for example, device diagnostics performed by an OS or a specific application program of the higher-level device 11 or 12. Hereinafter, this access is called a polling input/output (I/O) in some cases. The polling I/O is performed on a specific address on a periodic basis (for example, at given time intervals). In addition, the size of data (for example, the data a) requested by the polling I/O is a given size or is smaller than a predetermined size.

The control unit 21 identifies the polling I/O, based on such a property of the polling I/O as described above, and in a case where an access (polling I/O) is requested in order to monitor the memory device 31 set to the power saving mode, the control unit 21 defines, as an access destination, the memory area into which the data a is copied. In other words, in the example of FIG. 1, the alternative device 32 including the copied data "a" is defined as the access destination. In this example, the data a is correctly sent as a response to the higher-level device 11, and monitoring processing based on the polling I/O is normally completed while maintaining the power saving mode of the memory device 31.

As described above, the data a used for responding to the polling I/O is held in the alternative device 32 different from the memory device 31 in the power saving mode, thereby enabling the control unit 21 to respond with the data a read from the alternative device 32 in a case of receiving the request for the polling I/O. As a result, it becomes possible to maintain the power saving mode of the memory device 31, and it becomes possible to more efficiently suppress power consumption.

Note that, a RAID device functioning as part of the disk array in the same way as the memory device 31 may be used as the alternative device 32. If a memory device operating in the normal operation mode is used as the alternative device 32 during, for example, the power saving mode of the memory device 31, it is possible to correctly respond to the polling I/O without cancelling the power saving mode.

In addition, for each of the higher-level devices 11 and 12, the control unit 21 may cause the memory unit 22 to store therein a specific address serving as an access destination based on the polling I/O, intervals of accesses to the specific address, and the size of requested data and may use, for determination of the polling I/O, the specific address serving as an access destination based on the polling I/O, the intervals of accesses to the specific address, and the size of requested data. In the example of FIG. 1, the memory unit 22 stores therein, for example, it that the higher-level device 11 requests data, whose size is 10 kB, at intervals of 30 seconds while defining a specific address A1 as the access destination.

If, for at least one of the access destination, the access interval, and the data size, a storage content of the memory unit 22 and a content of a request received from the higher-level device 11 or 12 are compared with each other, it is easily judged whether or not a requested access is the polling I/O. By combining, as a condition, for example, being an access to a same access destination and being a given access interval, the polling I/O is judged.

In this way, the control unit 21 judges the polling I/O and switches the access destination to the alternative device 32, thereby reducing a chance of cancelling the power saving mode. Accordingly, efficiently power consumption is suppressed.

As above, the first embodiment is described.

<2. Second Embodiment>

Next, a second embodiment will be described.

The second embodiment is related to a power-saving technology for including RAID groups each obtained by making redundant disks (for example, HDDs) by using the RAID technology and for suppressing power consumption by controlling operation modes of disks for each of the RAID groups. In what follows, for convenience of explanation, an example in which an ECO mode of putting a motor of a disk into an off-state and a normal mode of putting the motor of the disk into an on-state are switched for each of the RAID groups, thereby realizing low power consumption, will be described.

[2-1. System]

Figure 2:
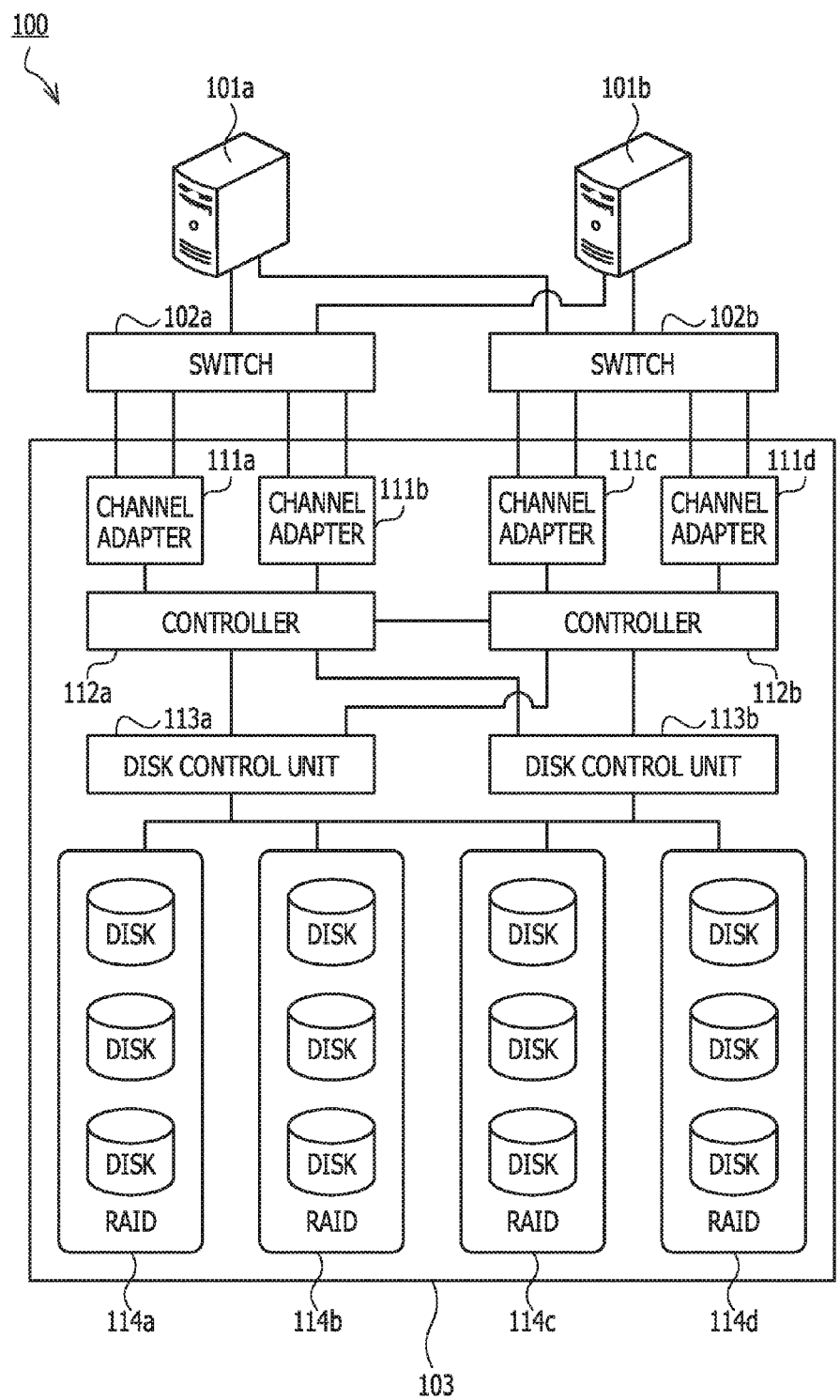
FIG. 2 illustrates an example of a storage system according to a second embodiment.

A storage system according to the second embodiment will be described with reference to FIG. 2. FIG. 2 illustrates an example of the storage system according to the second embodiment. A storage system 100 exemplified in FIG. 2 is an example of the storage system according to the second embodiment.

As illustrated in FIG. 2, the storage system 100 includes servers 101a and 101b, switches 102a and 102b, and a storage device 103. The servers 101a and 101b are coupled to the storage device 103 via the switches 102a and 102b. The servers 101a and 101b are computers each including a CPU, a RAM, an HDD, and so forth. The servers 101a and 101b each requests the storage device 103 to write or read data.

The storage device 103 includes channel adapters 111a, 111b, 111c, and 111d, controllers 112a and 112b, disk control units 113a and 113b, and RAID groups 114a, 114b, 114c, and 114d each configured by disks.

The channel adapters 111a, 111b, 111c, and 111d are adapter devices serving as interfaces with the switches 102a and 102b. The controllers 112a and 112b each includes a CPU and a memory and each perform processing for data accesses to the RAID groups 114a, 114b, 114c, and 114d and control of operation modes. The disk control units 113a and 113b each perform, for example, processing for reading or writing data from or into disks of the RAID groups 114a, 114b, 114c, and 114.

[2-2. Function of Controller]

Figure 3:
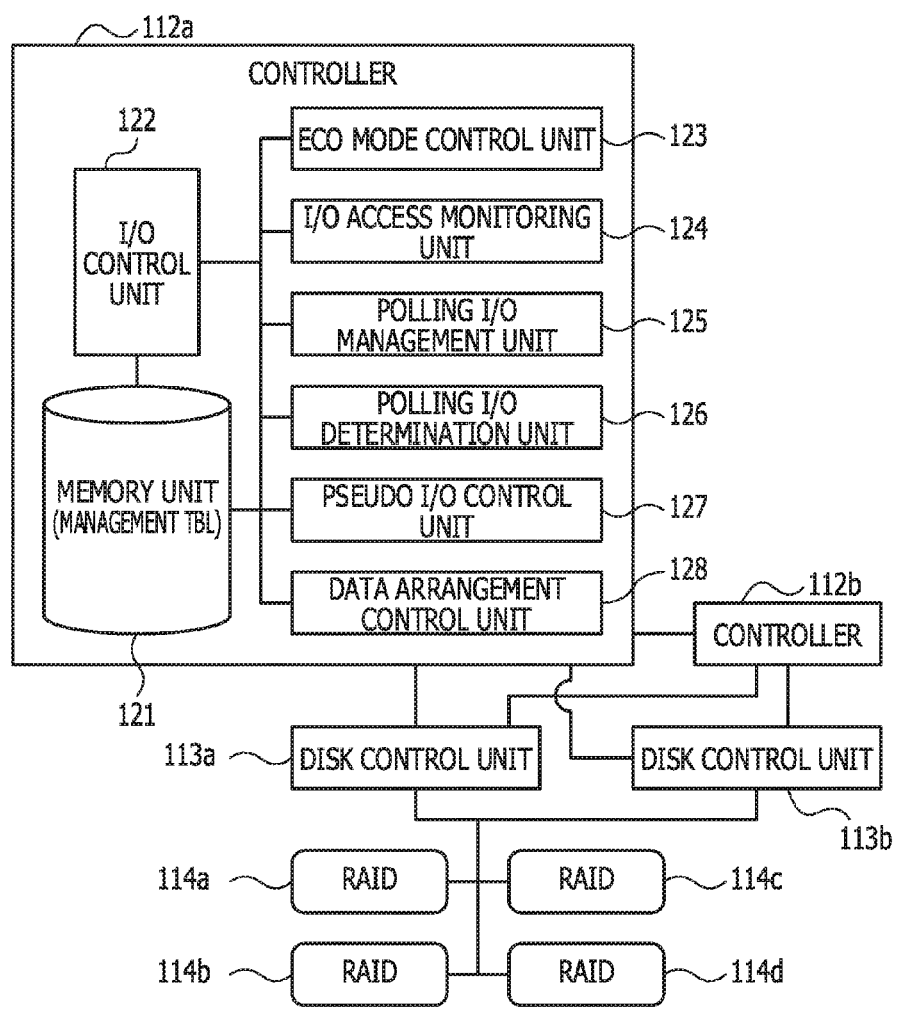
FIG. 3 illustrates examples of functions included in a controller according to the second embodiment.

Here, functions of the controllers 112a and 112b will be further described. In this regard, however, since the functions of the controllers 112a and 112b are identical to each other, the function of the controller 112a will be described, and the function of the controller 112b will be omitted. FIG. 3 illustrates examples of functions included in a controller according to the second embodiment.

As illustrated in FIG. 3, the controller 112a includes a memory unit 121, an I/O control unit 122, an ECO mode control unit 123, and an I/O access monitoring unit 124. Furthermore, the controller 112a includes a polling I/O management unit 125, a polling I/O determination unit 126, a pseudo I/O control unit 127, and a data arrangement control unit 128.

The ECO mode control unit 123, the I/O access monitoring unit 124, the polling I/O management unit 125, the polling I/O determination unit 126, the pseudo I/O control unit 127, and the data arrangement control unit 128 may be realized by a program that controls and causes a processor such as a CPU to perform processing.

Such a polling I/O management table as illustrated in FIG. 4 is stored in the memory unit 121. The polling I/O management table is a table storing therein information (entry information) related to an I/O access (polling I/O) periodically performed on disks of RAID groups by the server 101a or 101b in order to perform monitoring such as device diagnostics. FIG. 4 illustrates an example of a polling I/O management table according to the second embodiment.

Members of the entry information include, for example, a server, a logical unit number (LUN), a LUN address, a data size, a final access time, a monitoring status, a polling I/O determination result, and a polling I/O attribute. Furthermore, the members of the entry information include a polling I/O access time (latest), a polling I/O access time (previous), a polling I/O interval, a polling I/O reception counter, an alternative destination, and an alternative destination address.

In the field of the server, information (for example, a world wide name (WWN)) for identifying a server to be monitored is registered as a transmission source of the polling I/O. In the field of the LUN, a LUN for identifying a logical volume serving as a destination of an access performed by a server serving as a monitoring target is registered. In the field of the LUN address, an address (an access destination based on the polling I/O: for example, a logical block address (LBA)) of a logical volume accessed by the server serving as a monitoring target is registered. In the field of the data size, the size (an access size based on the polling I/O) of data accessed by the server serving as a monitoring target is registered.

In the field of the final access time, a time when an access other than the polling I/O is finally performed is registered. In the field of the monitoring status, a monitoring status ("before being monitored" (0x00), "during being monitored" (0x01), or "already monitored" (0xFF)) of the polling I/O is registered. In the field of the polling I/O determination result, a determination result ("existence" (0x01), "absence" (0xFF), or "N/A" (0x00)) indicating whether or not the polling I/O is received is registered. In the field of the polling I/O attribute, the attribute ("write attribute" (0x01), "read attribute" (0x02), or "N/A" (0x00)) of the polling I/O is registered.

In the field of the polling I/O access time (latest), an access time based on the latest polling I/O is registered. In the field of the polling I/O access time (previous), an access time based on a previous polling I/O (previous to the latest one) is registered. In the field of the polling I/O interval, a time interval (interval) at which the polling I/O is generated is registered. In the field of the polling I/O reception counter, the number of times the polling I/O is received is registered.

In the field of the alternative destination, information ("memory" (0x01, 0xFFFF), "another RAID group" (0x02, 0x0001), or "N/A" (0x00, 0x0000)) related to a copy destination into which specific data existing in a RAID group set to the ECO mode is copied is registered. For example, a number (0x02 or the like) indicating the type of alternative destination and a number (0x0001) for identifying an alternative destination such as a LUN are registered. In the field of the alternative destination address, an address at which the specific data copied into the alternative destination exists is registered. For example, information such as a memory address, a cache page, a disk LBA, or the like is registered.

As described later, the controller 112a copies, into an alternative destination, specific data used for a response to the polling I/O, and in a case of receiving the polling I/O addressed to a RAID group set to the ECO mode, the controller 112a performs control (pseudo I/O control) for defining the access destination of the polling I/O to the alternative destination. At that time, contents described in the fields of the alternative destination and the alternative destination address in the polling I/O management table are referenced.

FIG. 3 is referenced again. The I/O control unit 122 processes a write request or a read request (hereinafter, called a request I/O) received from the server 101a or 101b. At the time of switching the operation mode, the ECO mode control unit 123 controls turning on/turning off of a motor for a disk of a RAID group serving as a target.

The I/O access monitoring unit 124 monitors an access that is received from the server 101a or 101b and that is addressed to a RAID group set to the ECO mode. In addition, in a case of receiving the polling I/O whose entry does not exist in the polling I/O management table, the I/O access monitoring unit 124 enters, as a monitoring target, the polling I/O in the polling I/O management table.

In accordance with the request I/O received from the server 101a or 101b, the polling I/O management unit 125 updates the polling I/O management table. The polling I/O determination unit 126 determines whether the request I/O received from the server 101a or 101b is the polling I/O or a normal I/O access.

The pseudo I/O control unit 127 references the polling I/O management table, and in a case of receiving the polling I/O addressed to a RAID group set to the ECO mode, the pseudo I/O control unit 127 accesses an alternative destination and responds to the polling I/O in a pseudo manner. The data arrangement control unit 128 reads data (hereinafter, called response data), which exists in an access destination block of the polling I/O, from a RAID group that transitions to the ECO mode, and the data arrangement control unit 128 arranges the response data at the alternative destination.

(Updating Method for Polling I/O Management Table)

Figure 5:
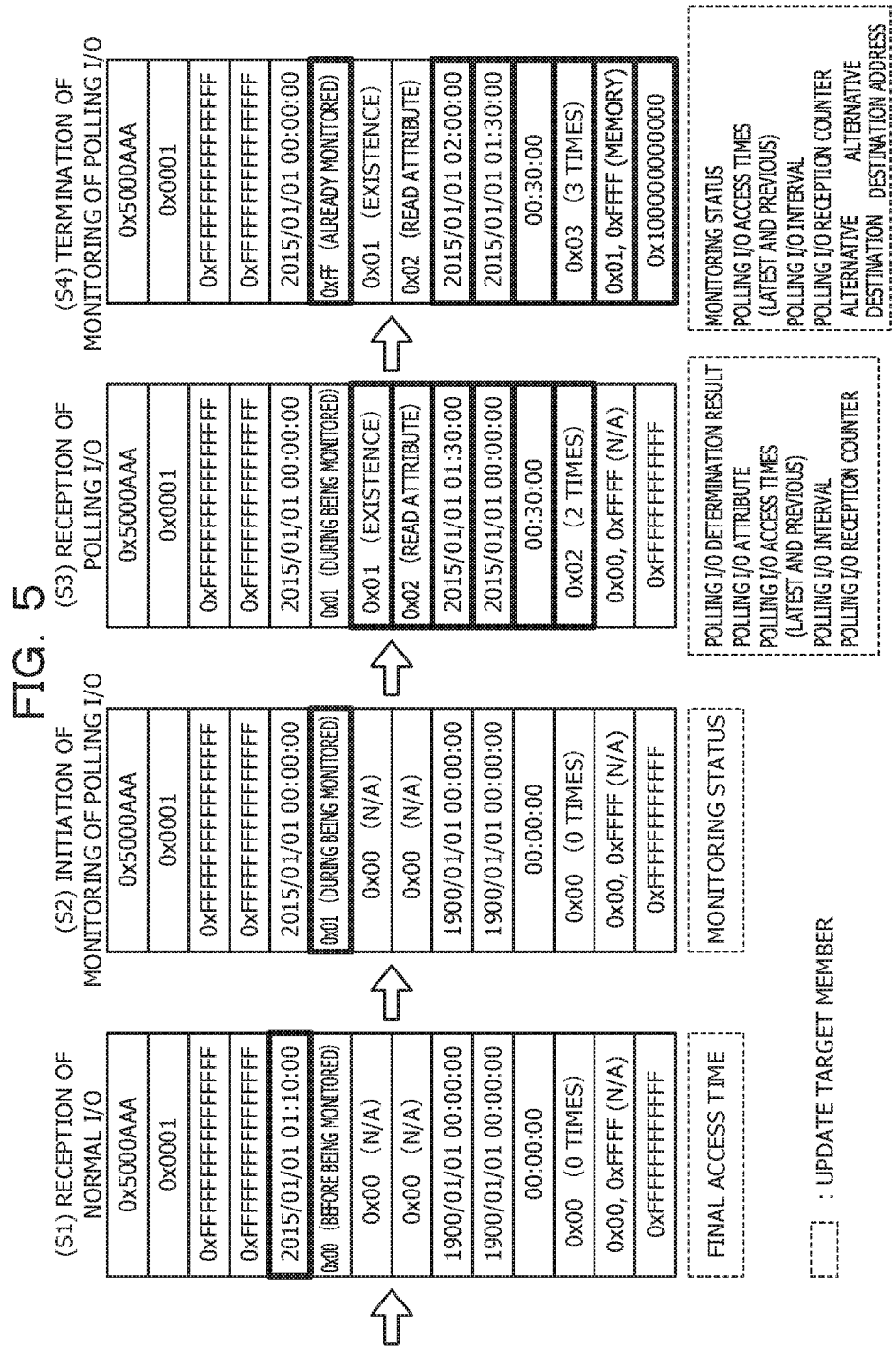
FIG. 5 illustrates an updating method for the polling I/O management table according to the second embodiment.

As described above, by using the polling I/O management table, the controller 112a manages the polling I/O for each of servers. Here, an updating method for the polling I/O management table will be further described with reference to FIG. 5. FIG. 5 illustrates an updating method for the polling I/O management table according to the second embodiment.

Here, by using, as an example, the entry information of an entry #1 of the polling I/O management table illustrated in FIG. 4, the updating method will be described.

(S1) In a case of receiving a normal request I/O (normal I/O) different from the polling I/O, a content registered in the field of the final access time is updated to a time when that normal I/O is received.

(S2) In a case of initiating monitoring of the polling I/O, a content ("before being monitored") registered in the field of the monitoring status is updated to a content ("during being monitored") indicating being in a state of monitoring the polling I/O.

(S3) In a case of receiving the polling I/O, a content registered in the field of the polling I/O determination result is updated to a content (existence) indicating that the polling I/O is detected. Note that the example of FIG. 5 illustrates the updating method at the time of the second reception after initiating the monitoring. In addition, a content registered in the field of the polling I/O attribute is updated to a content indicating the attribute (read attribute) of the received polling I/O.

In addition, a content registered in the field of the polling I/O access time (previous) is overwritten with a content registered in the field of the polling I/O access time (latest). In addition, a content registered in the field of the polling I/O access time (latest) is updated to a time when the polling I/O is received in this case. In addition, a content registered in the field of the polling I/O interval is updated with an interval calculated from the updated polling I/O access times (previous and latest). In addition, the polling I/O reception counter is incremented.

(S4) In a case of terminating the monitoring of the polling I/O, a content ("during being monitored") registered in the field of the monitoring status is updated to a content ("already monitored") indicating that a state of monitoring the polling I/O is cancelled. Note that in a case where the polling I/O is received and the monitoring is terminated, contents of the polling I/O access times (latest and previous), the polling I/O interval, and the polling I/O reception counter are updated in the same way as in S3. In addition, in a case where the response data is copied into the alternative destination, contents registered in the field of the alternative destination and the alternative destination address are updated.

As described above, the polling I/O is monitored, and contents of the polling I/O management table are updated for the polling I/Os of the predetermined number of times, thereby obtaining pieces of information such as the polling I/O interval and so forth useful for determining the polling I/O.

[2-3. Processing Flow]

Here, processing performed by the controller 112a will be further described with reference to FIGS. 6 to 17. Note that, in the drawings, the polling I/O management table is simply expressed as a management table. In addition, the same applies to processing performed by the controller 112b.

(2-3-1. Processing at Time of Receiving Login)

Figure 6:
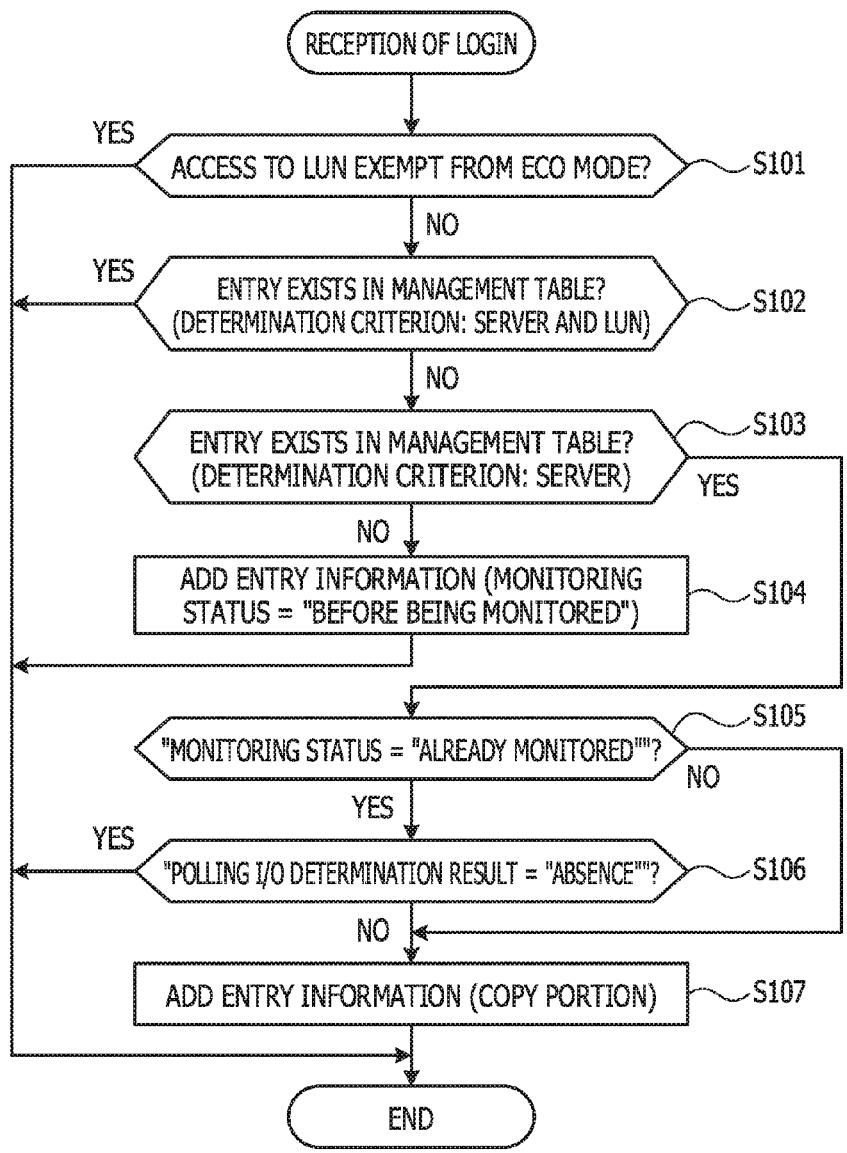
FIG. 6 illustrates a processing flow at the time of receiving a login, performed by the controller according to the second embodiment.

Processing at the time of receiving a login request from the server 101a or 101b will be described with reference to FIG. 6. FIG. 6 illustrates a processing flow at the time of receiving a login, performed by the controller according to the second embodiment.

(S101) The I/O access monitoring unit 124 determines whether or not a target of the received login is an access to a LUN exempt from the ECO mode (a LUN corresponding to a RAID group, not set to the ECO mode). In a case of an access to a LUN exempt from the ECO mode, a series of processing operations illustrated in FIG. 6 is terminated. On the other hand, in a case of not being an access to a LUN exempt from the ECO mode, the processing proceeds to S102.

(S102) The polling I/O management unit 125 determines whether or not an entry corresponding to a combination of a server serving as a login source and a LUN serving as a target exists in the polling I/O management table. In a case where the corresponding entry exists in the polling I/O management table, the series of processing operations illustrated in FIG. 6 is terminated. On the other hand, in a case where the corresponding entry does not exist in the polling I/O management table, the processing proceeds to S103.

(S103) The polling I/O management unit 125 determines whether or not an entry corresponding to the server serving as a login source exists in the polling I/O management table. In a case where the corresponding entry exists in the polling I/O management table, the processing proceeds to S105. On the other hand, in a case where the corresponding entry does not exist in the polling I/O management table, the processing proceeds to S104.

(S104) The polling I/O management unit 125 adds, to the polling I/O management table, entry information corresponding to the combination of the server serving as a login source and the LUN serving as a target. At this time, the polling I/O management unit 125 sets the monitoring status of the added entry information to "before being monitored". If the processing operation in S104 is completed, the series of processing operations illustrated in FIG. 6 is terminated.

(S105) The polling I/O management unit 125 references the monitoring status in entry information corresponding to the server serving as a login source and determines whether or not the monitoring status is "already monitored". In a case where the monitoring status is "already monitored", the processing proceeds to S106. On the other hand, in a case where the monitoring status is not "already monitored", the processing proceeds to S107.

(S106) The polling I/O management unit 125 references a polling I/O determination result of the entry information corresponding to the server serving as a login source and determines whether or not the polling I/O determination result is "absence". In a case where the polling I/O determination result is "absence", the series of processing operations illustrated in FIG. 6 is terminated. In a case where the polling I/O determination result is not "absence", the processing proceeds to S107.

(S107) The polling I/O management unit 125 adds, to the polling I/O management table, the entry information corresponding to the combination of the server serving as a login source and the LUN serving as a target. At this time, the polling I/O management unit 125 copies a portion (the monitoring status and the polling I/O determination result) of the entry information corresponding to the server serving as a login source. If the processing operation in S107 is completed, the series of processing operations illustrated in FIG. 6 is terminated.

(2-3-2. Processing at Time of Receiving I/O)

Next, processing performed by the controller 112a at the time of receiving a request I/O from the server 101a or 101b will be described with reference to FIGS. 7 and 8. Note that the same applies to processing performed by the controller 112b.

Figure 7:
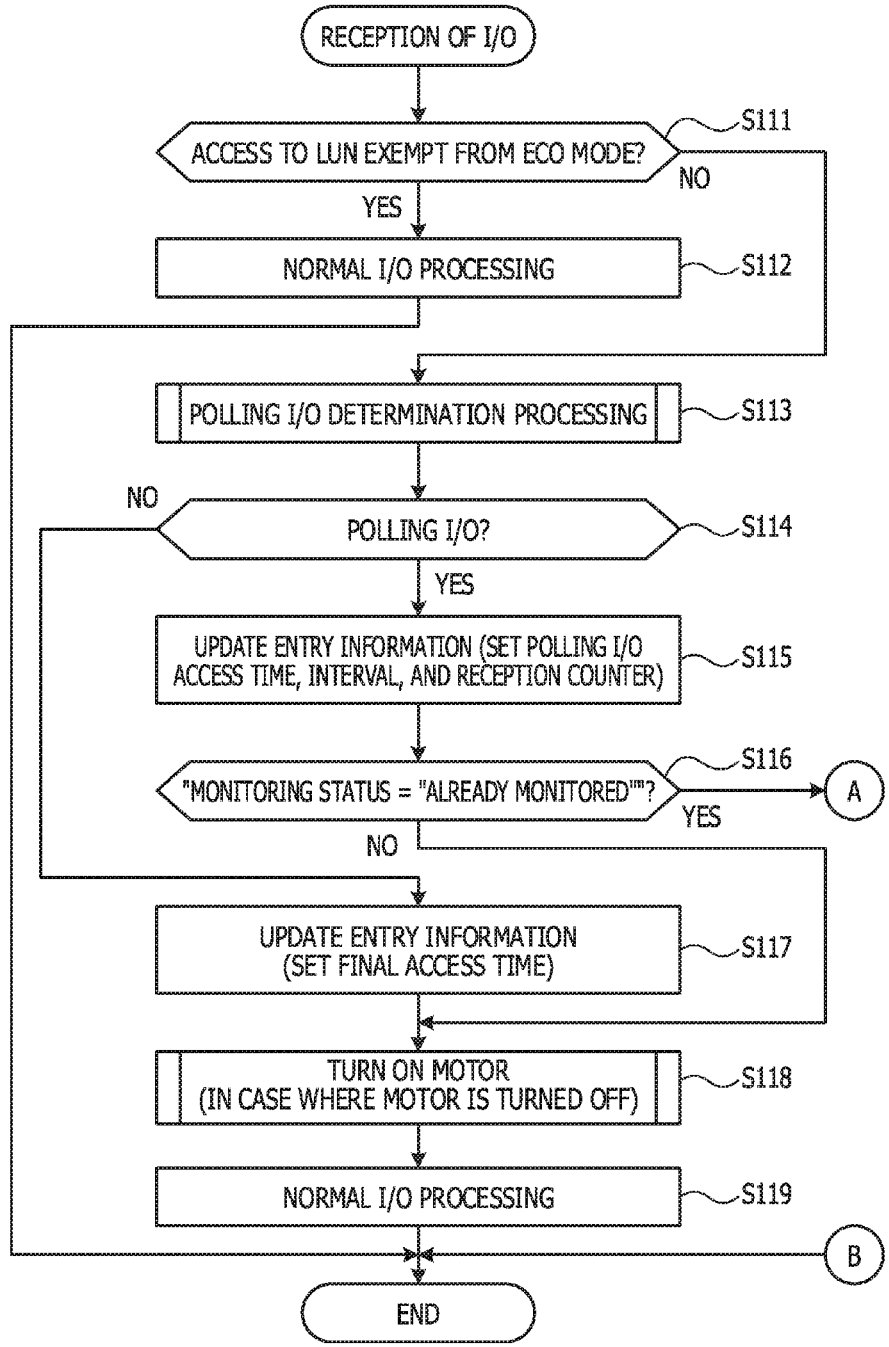
FIGS. 7 and 8 illustrate a processing flow at the time of receiving an I/O, performed by the controller according to the second embodiment.
Figure 8:
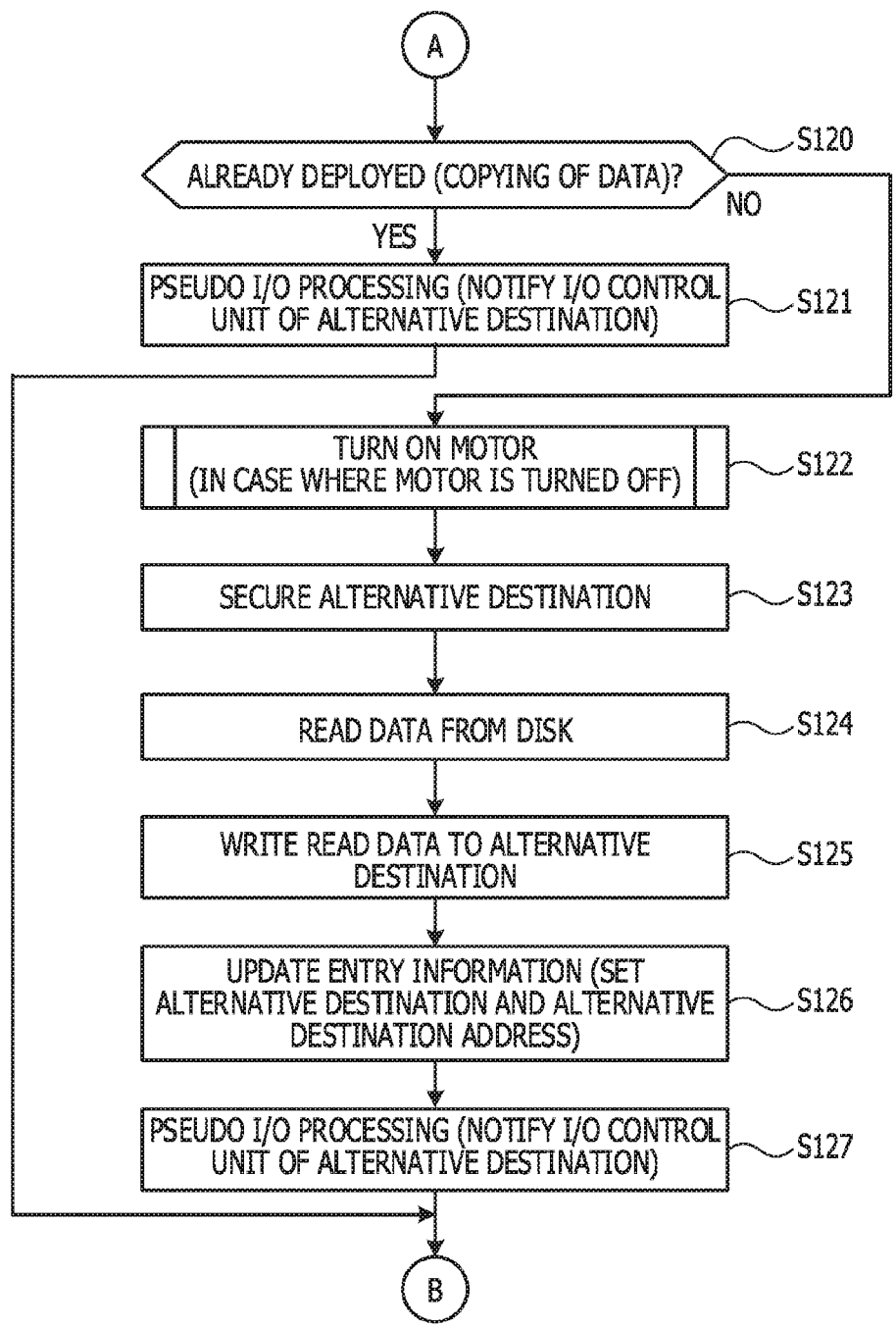

FIGS. 7 and 8 illustrate a processing flow at the time of receiving an I/O, performed by the controller according to the second embodiment.

(S111) The I/O access monitoring unit 124 determines whether or not a target of the received login is an access to a LUN exempt from the ECO mode (a LUN corresponding to a RAID group, not set to the ECO mode). In a case of an access to a LUN exempt from the ECO mode, the processing proceeds to S112. On the other hand, in a case of not being an access to a LUN exempt from the ECO mode, the processing proceeds to S113.

(S112) The I/O control unit 122 performs processing (an access to a RAID group) corresponding to the received request I/O and performs processing for responding to the request I/O. If the processing operation in S112 is completed, a series of processing operations illustrated in FIGS. 7 and 8 is terminated.

(S113) The polling I/O determination unit 126 performs processing (polling I/O determination processing) for determining whether or not the received request I/O is the polling I/O. The polling I/O determination processing will be described later.

(S114) In a case where, in S113, it is determined that the request I/O is the polling I/O, the processing proceeds to S115. On the other hand, in a case where, in S113, it is determined that the request I/O is not the polling I/O, the processing proceeds to S117.

(S115) The polling I/O management unit 125 sets the polling I/O access time (previous) to a content of the polling I/O access time (latest) in the polling I/O management table. In addition, the polling I/O management unit 125 sets the polling I/O access time (latest) to a time when the polling I/O is received in this case.

In addition, the polling I/O management unit 125 calculates an interval from contents of the updated polling I/O access times (previous and latest) and sets the polling I/O interval to that calculation result. In addition, the polling I/O management unit 125 increments the polling I/O reception counter. In this way, the polling I/O management unit 125 updates the entry information of the polling I/O management table (see (S3) in FIG. 5).

(S116) The polling I/O management unit 125 determines whether or not the monitoring status of the updated entry information is "already monitored". In a case where the monitoring status is "already monitored", the processing proceeds to S120. On the other hand, in a case where the monitoring status is not "already monitored", the processing proceeds to S118.

(S117) In the polling I/O management table, the polling I/O management unit 125 sets the final access time to a time when the request I/O is received in this case.

(S118) In a case where a RAID group to serve as an access destination of the request I/O is set to the ECO mode, the ECO mode control unit 123 turns on a motor of a disk belonging to that RAID group. In a case where the RAID group to serve as an access destination of the request I/O is not in the ECO mode, the ECO mode control unit 123 does not control the motor. Control processing for turning on a motor will be described later.

(S119) The I/O control unit 122 performs processing (an access to the RAID group) corresponding to the received request I/O and performs processing for responding to the request I/O. If the processing operation in S119 is completed, the series of processing operations illustrated in FIGS. 7 and 8 is terminated.

(S120) The data arrangement control unit 128 determines whether or not data (response data) of the access destination based on the polling I/O is already deployed (copying of data). In other words, the data arrangement control unit 128 references the alternative destination in the polling I/O management table and determines whether or not the response data is already copied into the alternative destination. In a case of being already deployed, the processing proceeds to S121. On the other hand, in a case of not being already deployed, the processing proceeds to S122.

(S121) The pseudo I/O control unit 127 reads, from the polling I/O management table, information (the alternative destination and the alternative destination address) of the corresponding alternative destination and notifies the I/O control unit 122 of the information (pseudo I/O processing). The I/O control unit 122 performs the response processing while defining, as the access destination of the polling I/O, the alternative destination indicated by the information given notice of by the pseudo I/O control unit 127. If the processing operation in S121 is completed, the series of processing operations illustrated in FIGS. 7 and 8 is terminated.

(S122) In a case where the RAID group to serve as the access destination of the polling I/O is set to the ECO mode, the ECO mode control unit 123 turns on a motor of a disk belonging to that RAID group. In a case where the RAID group to serve as the access destination of the polling I/O is not in the ECO mode, the ECO mode control unit 123 does not control the motor. Control processing for turning on a motor will be described later.

(S123) The data arrangement control unit 128 secures an alternative destination into which response data of the RAID group to serve as the access destination of the polling I/O is copied.

As the alternative destination, for example, a RAID group different from the RAID group serving as a copy source, an alternative memory provided separately from a disk of a RAID group, a cache memory used as a cache, or the like only has to be used. In a case of defining the different RAID group as the alternative destination, a RAID group operating in a normal mode is a candidate for the alternative destination while the RAID group serving as the copy source is set to the ECO mode.

(S124, S125) The data arrangement control unit 128 reads data from a disk of the RAID group to serve as the access destination of the polling I/O. In addition, the data arrangement control unit 128 writes the read data to the alternative destination secured in S123.

(S126) The data arrangement control unit 128 sets, in the entry information of the polling I/O management table, the alternative destination secured in S123 and the address (alternative destination address) at which the data is written.

(S127) The pseudo I/O control unit 127 notifies the I/O control unit 122 of the information (the alternative destination and the alternative destination address) of the alternative destination, set in the entry information of the polling I/O management table (pseudo I/O processing). The I/O control unit 122 performs the response processing while defining, as the access destination of the polling I/O, the alternative destination indicated by the information given notice of by the pseudo I/O control unit 127. If the processing operation in S127 is completed, the series of processing operations illustrated in FIGS. 7 and 8 is terminated.

(2-3-3. Processing at Time of Determining Polling I/O)

Figure 9:
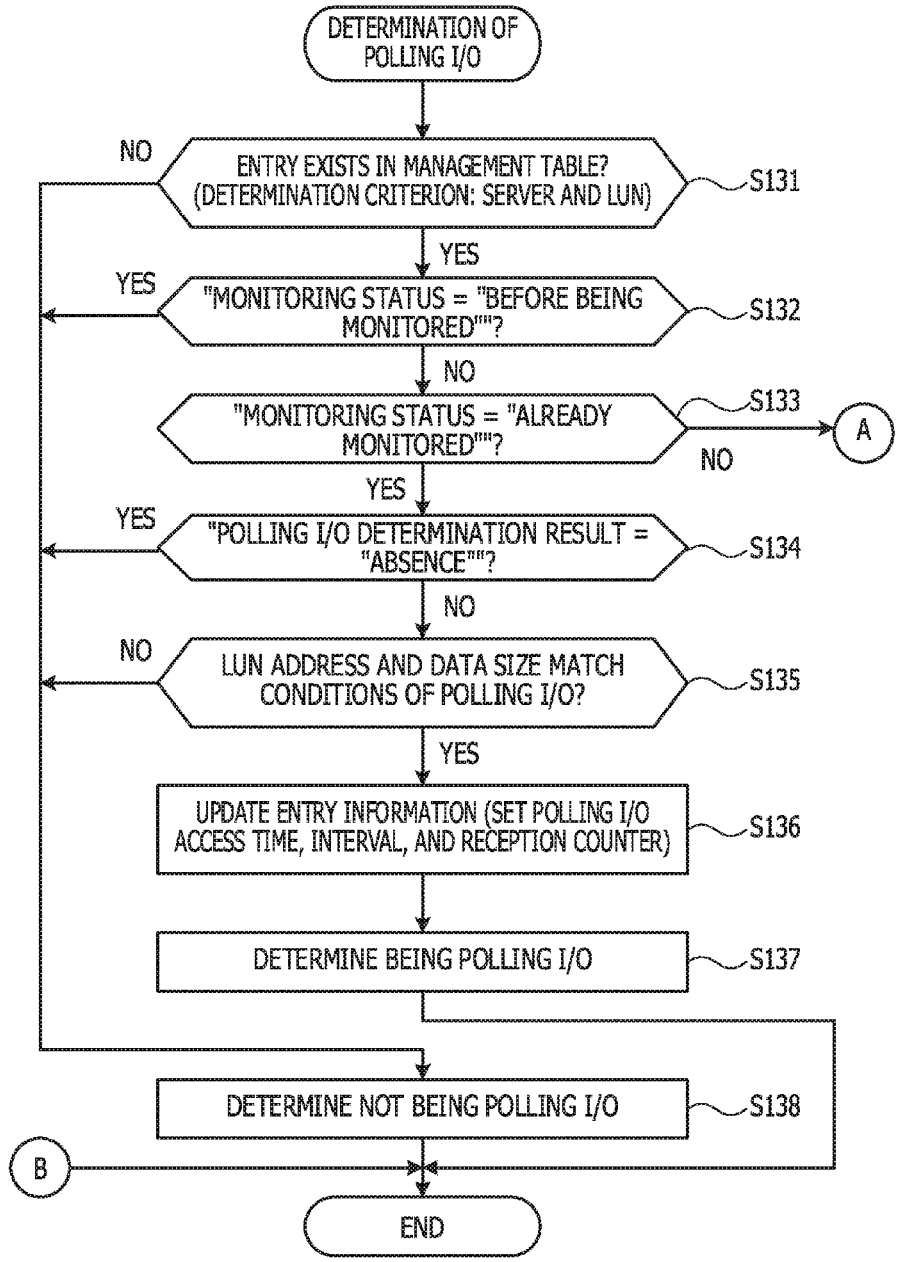
FIGS. 9 and 10 illustrate a processing flow at the time of determining a polling I/O, performed by the controller according to the second embodiment.
Figure 10:
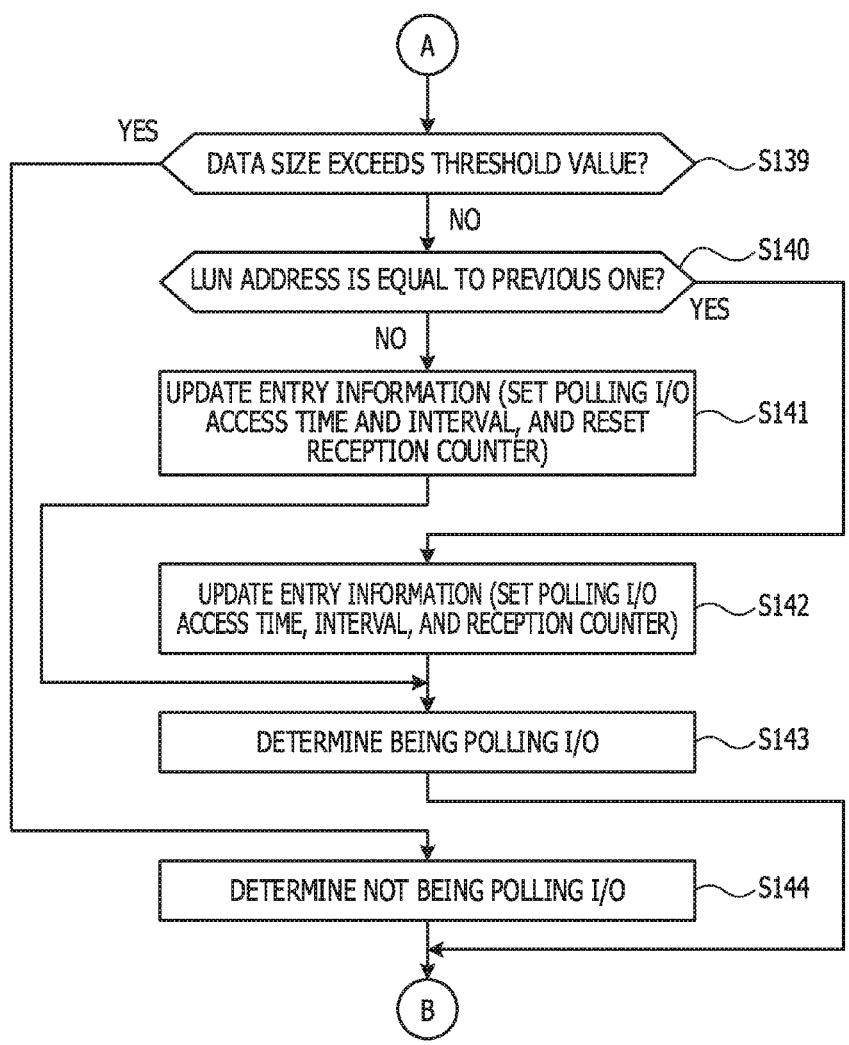

Here, polling I/O determination processing (see S113) for determining whether a request I/O is a polling I/O will be described with reference to FIGS. 9 and 10. FIGS. 9 and 10 illustrate a processing flow at the time of determining a polling I/O, performed by the controller according to the second embodiment.

(S131) The polling I/O determination unit 126 determines whether or not an entry corresponding to a combination of a server that transmits the request I/O and a LUN serving as a target exists in the polling I/O management table. In a case where the corresponding entry exists in the polling I/O management table, the processing proceeds to S132. On the other hand, in a case where the corresponding entry does not exist in the polling I/O management table, the processing proceeds to S138.

(S132) The polling I/O determination unit 126 references the monitoring status in entry information corresponding to the server that transmits the request I/O, and the polling I/O determination unit 126 determines whether or not the monitoring status is "before being monitored". In a case where the monitoring status is "before being monitored", the processing proceeds to S138. On the other hand, in a case where the monitoring status is not "before being monitored", the processing proceeds to S133.

(S133) The polling I/O determination unit 126 references the monitoring status in the entry information corresponding to the server that transmits the request I/O, and the polling I/O determination unit 126 determines whether or not the monitoring status is "already monitored". In a case where the monitoring status is "already monitored", the processing proceeds to S134. On the other hand, in a case where the monitoring status is not "already monitored", the processing proceeds to S139.

(S134) The polling I/O determination unit 126 references a polling I/O determination result of the entry information corresponding to the server that transmits the request I/O, and the polling I/O determination unit 126 determines whether or not the polling I/O determination result is "absence". In a case where the polling I/O determination result is "absence", the processing proceeds to S138. In a case where the polling I/O determination result is not "absence", the processing proceeds to S135.

(S135) The polling I/O determination unit 126 references the corresponding entry information and determines whether or not a LUN address to serve as an access destination of the request I/O and the data size of data to serve as a target match conditions of the polling I/O.

For example, the polling I/O determination unit 126 determines whether or not a LUN address described in the entry information matches a LUN address to serve as an access destination of the request I/O received in this case. Furthermore, the polling I/O determination unit 126 determines whether or not a data size described in the entry information and the data size of data to be accessed by the request I/O received in this case match each other. Note that the order of the determination operations may be reversed. In a case where the two thereof match, the polling I/O determination unit 126 determines matching the conditions of the polling I/O.

In a case of matching the conditions of the polling I/O, the processing proceeds to S136. On the other hand, in a case of not matching the conditions of the polling I/O, the processing proceeds to S138.

(S136) The polling I/O determination unit 126 sets the polling I/O access time (previous) to a content of the polling I/O access time (latest) in the polling I/O management table.

In addition, the polling I/O determination unit 126 sets the polling I/O access time (latest) to a time when the request I/O is received in this case.

In addition, the polling I/O determination unit 126 calculates an interval from contents of the updated polling I/O access times (previous and latest) and sets the polling I/O interval to that calculation result. In addition, the polling I/O determination unit 126 increments the polling I/O reception counter. In this way, the polling I/O determination unit 126 updates the entry information of the polling I/O management table.

(S137) The polling I/O determination unit 126 determines that the request I/O is the polling I/O, and the polling I/O determination unit 126 terminates the series of processing operations illustrated in FIGS. 9 and 10.

(S138) The polling I/O determination unit 126 determines that the request I/O is not the polling I/O, and the polling I/O determination unit 126 terminates the series of processing operations illustrated in FIGS. 9 and 10.

(S139) The polling I/O determination unit 126 determines whether or not the data size of the data to be accessed by the request I/O exceeds a preliminarily set threshold value. In a case where the data size exceeds the threshold value, the processing proceeds to S144. On the other hand, in a case where the data size does not exceed the threshold value, the processing proceeds to S140.

Note that the threshold value may be set to a value nearly equal to the size of the response data of the polling I/O previously received from the same server (the size thereof+ an acceptable error) and may be set to a value nearly equal to the size of data usually used as the response data of the polling I/O. If a corresponding entry exists, the data size of data accessed by the previous polling I/O may be extracted from the entry information in the polling I/O management table.

(S140) The polling I/O determination unit 126 determines whether or not the LUN address to serve as an access destination of the request I/O is equal to the access destination of the previously received request I/O. In a case where the LUN address is equal to the previous one, the processing proceeds to S142. In a case where the LUN address is not equal to the previous one, the processing proceeds to S141. In this way, the request I/O that successively accesses the same access destination is matched with the property of the polling I/O. Therefore, by comparing the LUN addresses of the access destinations with each other, the polling I/O is judged.

(S141) The polling I/O determination unit 126 sets the polling I/O access time (previous) to a content of the polling I/O access time (latest) in the polling I/O management table. In addition, the polling I/O determination unit 126 sets the polling I/O access time (latest) to a time when the request I/O is received in this case.

In addition, the polling I/O determination unit 126 calculates an interval from contents of the updated polling I/O access times (previous and latest) and sets the polling I/O interval to that calculation result. In addition, the polling I/O determination unit 126 resets the polling I/O reception counter to "0". In this way, the polling I/O determination unit 126 updates the entry information of the polling I/O management table. If the processing operation in S141 is completed, the processing proceeds to S143.

(S142) The polling I/O determination unit 126 sets the polling I/O access time (previous) to a content of the polling I/O access time (latest) in the polling I/O management table.

In addition, the polling I/O determination unit 126 sets the polling I/O access time (latest) to a time when the request I/O is received in this case.

In addition, the polling I/O determination unit 126 calculates an interval from contents of the updated polling I/O access times (previous and latest) and sets the polling I/O interval to that calculation result. In addition, the polling I/O determination unit 126 increments the polling I/O reception counter. In this way, the polling I/O determination unit 126 updates the entry information of the polling I/O management table.

(S143) The polling I/O determination unit 126 determines that the request I/O is the polling I/O, and the polling I/O determination unit 126 terminates the series of processing operations illustrated in FIGS. 9 and 10.

(S144) The polling I/O determination unit 126 determines that the request I/O is not the polling I/O, and the polling I/O determination unit 126 terminates the series of processing operations illustrated in FIGS. 9 and 10.

(2-3-4. Processing at Time of Monitoring I/O Access)

Next, processing performed by the controller 112*a* in a state of monitoring a request I/O will be described with reference to FIGS. 11 and 12. Note that the same applies to processing performed by the controller 112*b*.

Figure 11:
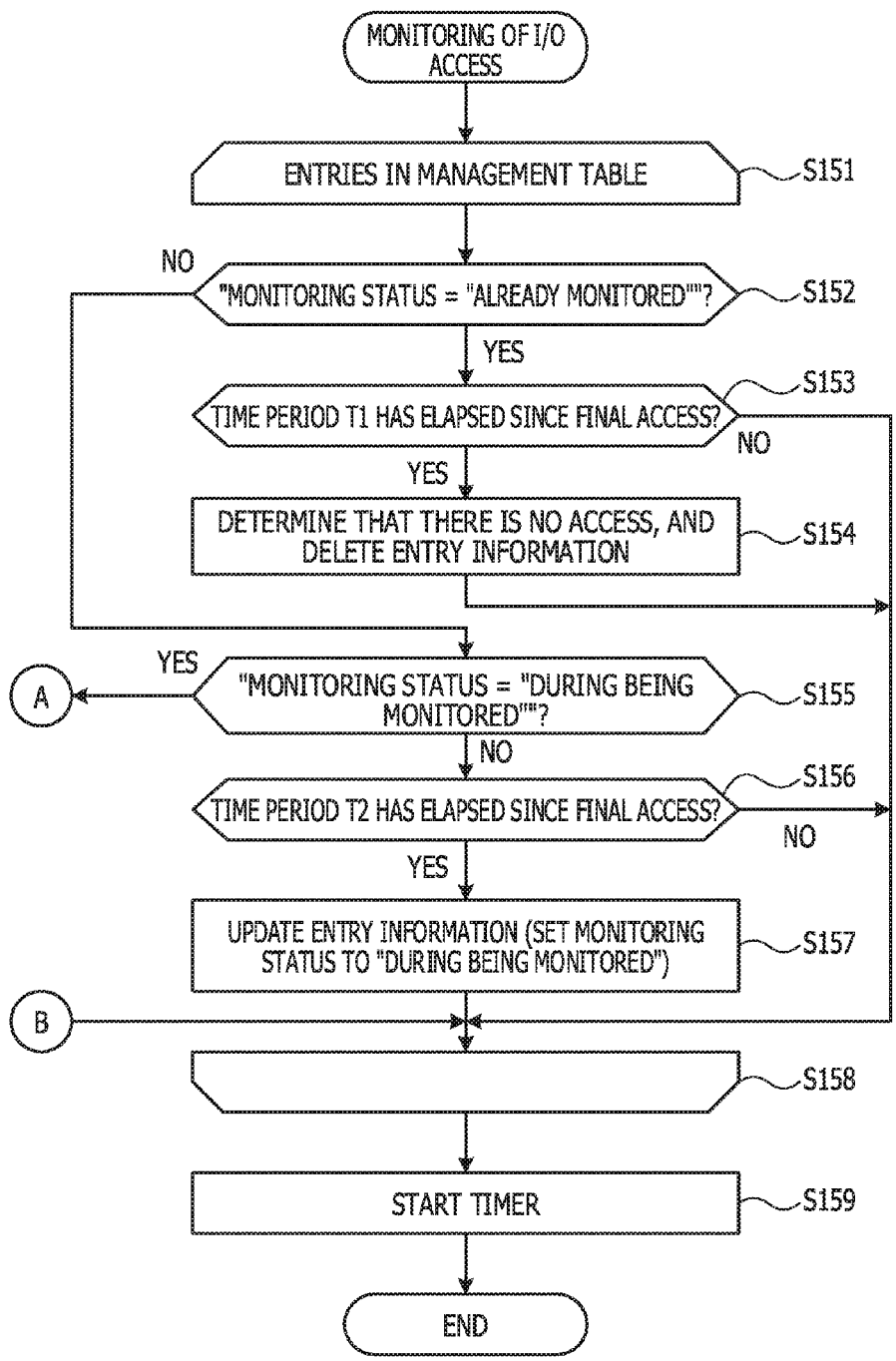
FIGS. 11 and 12 illustrate a processing flow at the time of monitoring an I/O access, performed by the controller according to the second embodiment.
Figure 12:
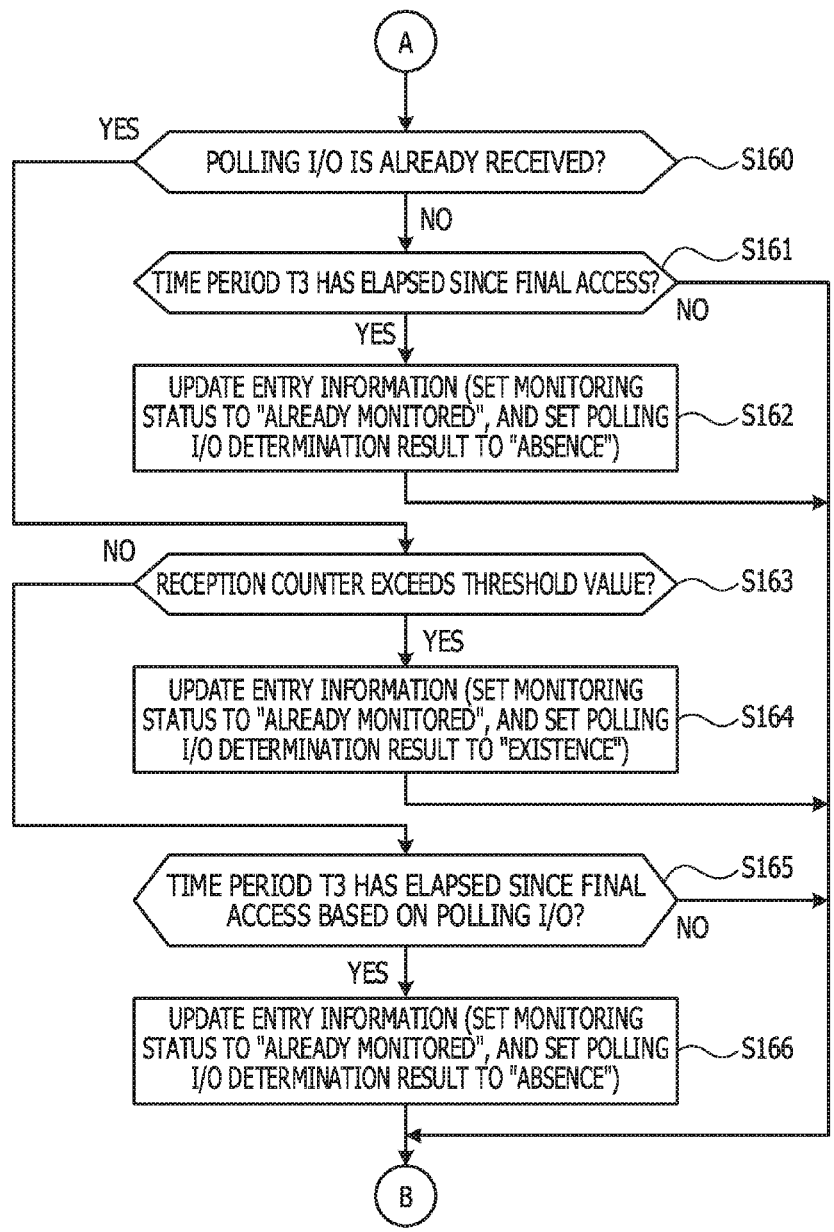

FIGS. 11 and 12 illustrate a processing flow at the time of monitoring an I/O access, performed by the controller according to the second embodiment.

Note that the processing illustrated in FIGS. 11 and 12 is performed at a point of time when a timer started at the time of terminating the relevant processing expires. The expiring time of the timer may be arbitrarily set.

(S151, S158) For each of the entries in the polling I/O management table, the I/O access monitoring unit 124 performs processing that begins from S152 and that leads to S158. In a case of finishing performing the relevant processing for all the entries existing in the polling I/O management table, the processing proceeds to S159. Hereinafter, in some case, an entry to serve as a processing target is called a target entry.

(S152) The I/O access monitoring unit 124 references the monitoring status in entry information corresponding to the target entry and determines whether or not the monitoring status is "already monitored". In a case where the monitoring status is "already monitored", the processing proceeds to S153. On the other hand, in a case where the monitoring status is not "already monitored", the processing proceeds to S155.

(S153) The I/O access monitoring unit 124 references a final access time registered in the entry information of the target entry and determines whether or not a time period T1 has elapsed since a final access. Note that the time period T1 is preliminarily set. The time period T1 is a parameter for specifying a time period that elapses before deleting entry information corresponding to an access destination not to be accessed, and the time period T1 may be arbitrarily set. In a case where the time period T1 has elapsed since the final access, the processing proceeds to S154. On the other hand, in a case where the time period T1 has not elapsed since the final access, the processing proceeds to S158.

(S154) The I/O access monitoring unit 124 determines that there is no access to the access destination corresponding to the target entry, and the I/O access monitoring unit 124 deletes the corresponding entry information from the polling I/O management table. In this way, by deleting the entry of an access destination not accessed during a given period of time, the size of the polling I/O management table is suppressed, and searching of an entry is made efficient. If the processing operation in S154 is completed, the processing proceeds to S158.

(S155) The I/O access monitoring unit 124 references the monitoring status in entry information corresponding to the target entry and determines whether or not the monitoring status is "during being monitored". In a case where the monitoring status is "during being monitored", the processing proceeds to S160 in FIG. 12. On the other hand, in a case where the monitoring status is not "during being monitored", the processing proceeds to S156.

(S156) The I/O access monitoring unit 124 references a final access time registered in the entry information of the target entry and determines whether or not a time period T2 has elapsed since a final access. Note that the time period T2 is preliminarily set. The time period T2 is a parameter to serve as a trigger for initiating the monitoring in a case where a state of "before being monitor" continues for a given period of time after the final access, and the time period T2 may be arbitrarily set. In a case where the time period T2 has elapsed since the final access, the processing proceeds to S157. On the other hand, in a case where the time period T2 has not elapsed since the final access, the processing proceeds to S158.

(S157) The I/O access monitoring unit 124 sets, to "during being monitored", the monitoring status in the entry information of the target entry and updates the entry information.

(S159) The I/O access monitoring unit 124 starts the timer. If the processing operation in S159 is completed, the series of processing operations illustrated in FIGS. 11 and 12 is terminated.

(S160) The I/O access monitoring unit 124 determines whether or not the polling I/O is already received. The I/O access monitoring unit 124 references, for example, a polling I/O determination result in the entry information of the target entry, and if the polling I/O determination result is "existence", the I/O access monitoring unit 124 determines that the polling I/O is already received. Note that the I/O access monitoring unit 124 may reference, for example, the value of the polling I/O reception counter at the time of determination. In a case where the polling I/O is already received, the processing proceeds to S163. On the other hand, in a case where the polling I/O is not already received, the processing proceeds to S161.

(S161) The I/O access monitoring unit 124 references a final access time registered in the entry information of the target entry and determines whether or not a time period T3 has elapsed since a final access. Note that the time period T3 is preliminarily set. The time period T3 is a parameter to serve as a trigger for terminating the monitoring in a case where a state of "during being monitor" continues for a given period of time after the final access, and the time period T3 may be arbitrarily set. In a case where the time period T3 has elapsed since the final access, the processing proceeds to S162. On the other hand, in a case where the time period T3 has not elapsed since the final access, the processing proceeds to S158.

(S162) The I/O access monitoring unit 124 sets, to "already monitored", the monitoring status in the entry information of the target entry and sets the polling I/O determination result to "absence", thereby updating the entry information. If the processing operation in S162 is completed, the processing proceeds to S158.

(S163) The I/O access monitoring unit 124 references the polling I/O reception counter of the target entry and determines whether or not the polling I/O reception counter exceeds a threshold value. Note that the threshold value used for this determination is a parameter to serve as a trigger for terminating the monitoring and may be arbitrarily set. In a case where the polling I/O reception counter exceeds the threshold value, the processing proceeds to S164. On the other hand, in a case where the polling I/O reception counter does not exceed the threshold value, the processing proceeds to S165.

(S164) The I/O access monitoring unit 124 sets, to "already monitored", the monitoring status in the entry information of the target entry and sets the polling I/O determination result to "existence", thereby updating the entry information. If the processing operation in S164 is completed, the processing proceeds to S158.

(S165) The I/O access monitoring unit 124 references a polling I/O access time (latest) registered in the entry information of the target entry and determines whether or not the time period T3 has elapsed since a final access based on the polling I/O. In a case where the time period T3 has elapsed since the final access based on the polling I/O, the processing proceeds to S166. On the other hand, in a case where the time period T3 has not elapsed since the final access based on the polling I/O, the processing proceeds to S158.

(S166) The I/O access monitoring unit 124 sets, to "already monitored", the monitoring status in the entry information of the target entry and sets the polling I/O determination result to "absence", thereby updating the entry information. If the processing operation in S166 is completed, the processing proceeds to S158.

(2-3-5. Motor Control Processing)

Next, processing performed by the controller 112a at the time of controlling a motor of a disk in association with setting and cancellation of the ECO mode will be described with reference to FIGS. 13 to 17. Note that the same applies to processing performed by the controller 112b.

The setting and cancellation of the ECO mode are performed following a schedule preliminarily fixed in units of RAID groups. In a case of being used as, for example, a backup system, the ECO mode control unit 123 intends to cancel the ECO mode of a RAID group serving as a target during a time period of a backup operation performed on the preliminarily fixed schedule and to maintain the ECO mode thereof during a time period other than that.

In this regard, however, in a case where non-scheduled processing (an irregular operation) is generated, if it is not the polling I/O, the ECO mode control unit 123 cancels the ECO mode of a RAID group to serve as the target thereof. On the other hand, since, as for the polling I/O, the pseudo I/O control unit 127 performs the response processing by using the response data of an alternative destination, the ECO mode of a RAID group to serve as a target thereof is not cancelled. Hereinafter, processing for controlling a motor in association with such setting and cancellation of the ECO mode will be described.

(Off→On)

Figure 13:
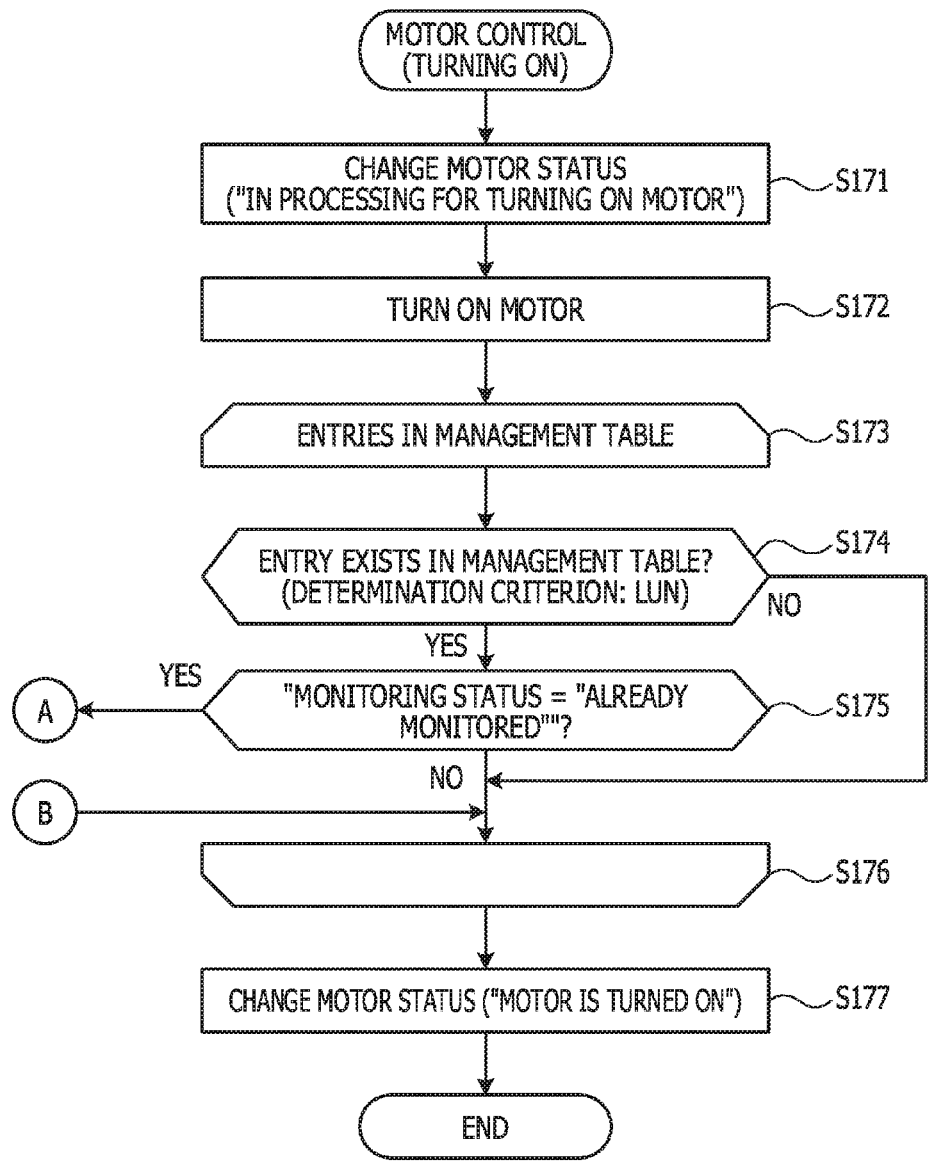
FIGS. 13 and 14 illustrate motor control processing (off →on) performed by the controller according to the second embodiment.
Figure 14:
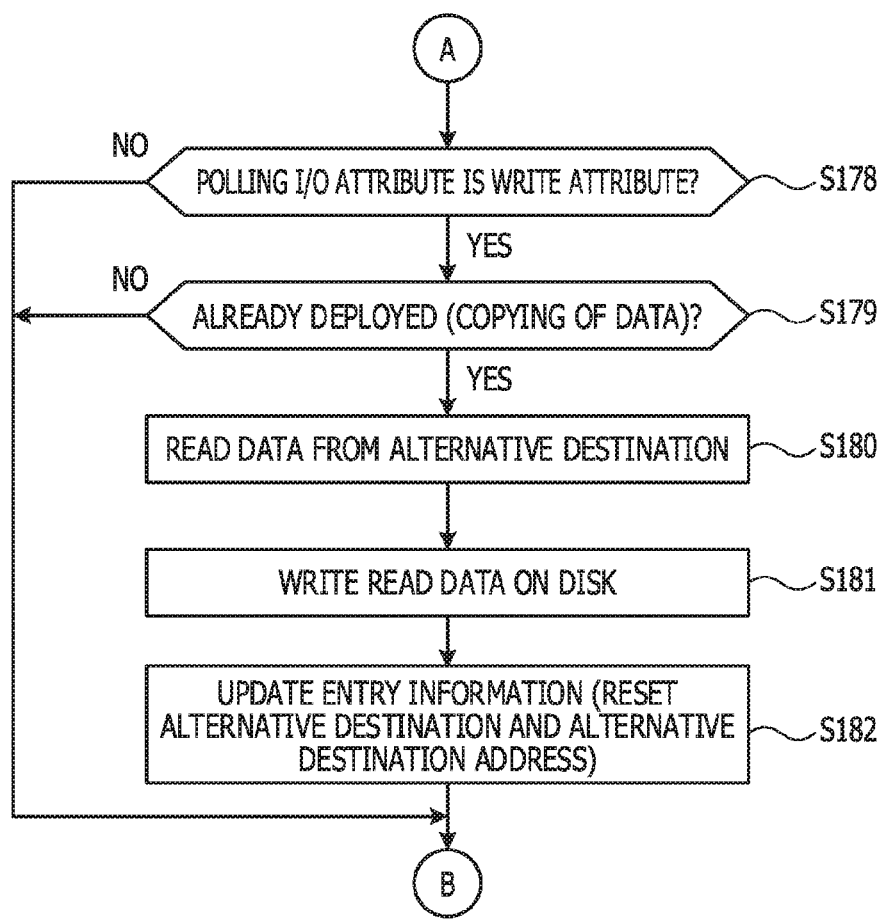

First, processing performed at the time of switching a motor of a disk from an off-state to an on-state (see S118 and S122) will be described with reference to FIGS. 13 and 14. FIGS. 13 and 14 illustrate motor control processing (off→on) performed by the controller according to the second embodiment.

Note that, for each of RAID groups, the ECO mode control unit 123 holds information (motor status) for managing a state in which a motor of a disk is. In a state in which the motor is turned on, the motor status is set to "a motor is turned on". In a state in which the motor is turned off, the motor status is set to "a motor is turned off". In the middle of processing for turning on the motor, the motor status is set to "in processing for turning on a motor". In the middle of processing for turning off the motor, the motor status is set to "in processing for turning off a motor".

(S171) The ECO mode control unit 123 changes, from "a motor is turned off" to "in processing for turning on a motor", the motor status of a RAID group (a RAID group serving as a target) to be restored from the ECO mode to the normal mode.

(S172) The ECO mode control unit 123 turns on a motor of a disk belonging to the RAID group serving as a target.

(S173, S176) For each of the entries in the polling I/O management table, the ECO mode control unit 123 performs processing that begins from S174 and that leads to S176. In a case of finishing performing the relevant processing for all the entries existing in the polling I/O management table, the processing proceeds to S177. Hereinafter, in some case, an entry to serve as a processing target is called a target entry.

(S174) The ECO mode control unit 123 determines whether or not an entry corresponding to a LUN indicating the RAID group serving as a target exists in the polling I/O management table. In a case where the corresponding entry exists in the polling I/O management table, the processing proceeds to S175. On the other hand, in a case where the corresponding entry does not exist in the polling I/O management table, the processing proceeds to S176.

(S175) The ECO mode control unit 123 references the monitoring status in entry information corresponding to the target entry and determines whether or not the monitoring status is "already monitored". In a case where the monitoring status is "already monitored", the processing proceeds to S178 in FIG. 14. On the other hand, in a case where the monitoring status is not "already monitored", the processing proceeds to S176.

(S177) The ECO mode control unit 123 changes the motor status of the RAID group serving as a target from "in processing for turning on a motor" to "a motor is turned on". If the processing operation in S177 is completed, the series of processing operations illustrated in FIGS. 13 and 14 is terminated.

(S178) The ECO mode control unit 123 references the polling I/O attribute in the entry information corresponding to the target entry and determines whether or not the polling I/O attribute is a write attribute. In a case where the polling I/O attribute is a write attribute, the processing proceeds to S179. On the other hand, in a case where the polling I/O attribute is not a write attribute, the processing proceeds to S176.

(S179) The ECO mode control unit 123 determines whether or not data (response data) for responding to the polling I/O for the RAID group serving as a target is already deployed (copying of data) in an alternative destination. The ECO mode control unit 123 references, for example, the alternative destination and the alternative destination address in the entry information corresponding to the target entry and determines whether or not the response data is already copied into the alternative destination. In a case of being already deployed, the processing proceeds to S180. On the other hand, in a case of not being already deployed, the processing proceeds to S176.

(S180, S181) The ECO mode control unit 123 references the alternative destination and the alternative destination address in the entry information corresponding to the target entry and reads data existing at the alternative destination address of the alternative destination. In addition, the ECO mode control unit 123 writes the read data on the disk of the RAID group serving as a target. According to this processing, a change in data, caused by an access to the alternative destination during a time period when the RAID group serving as a target is in the ECO mode, is reflected in data of a deployment source, stored in the disk of the relevant RAID group.

(S182) The ECO mode control unit 123 resets, to states of being unspecified (see FIG. 4), the alternative destination and the alternative destination address in the entry information corresponding to the target entry. If the processing operation in S182 is completed, the processing proceeds to S176.

(On→Off)

Next, processing performed at the time of switching a motor of a disk from an on-state to an off-state will be described with reference to FIGS. 15, 16, and 17. Note that here, for convenience of explanation, processing performed by the controller 112a is used as an example and is described. In this regard, however, the same applies to processing for controlling a motor, performed by the controller 112b.

Figure 15:
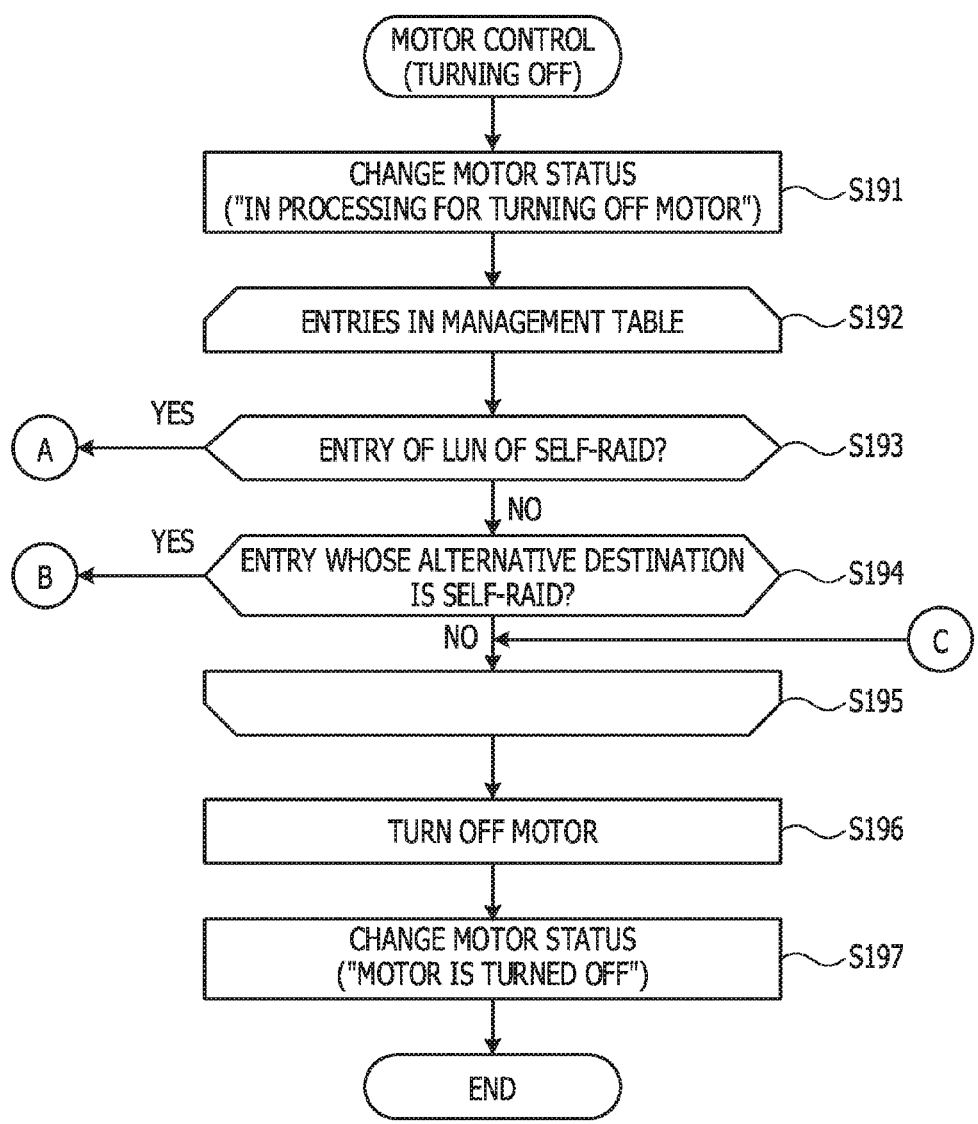
FIGS. 15, 16, and 17 illustrate motor control processing (on →off) performed by the controller according to the second embodiment.
Figure 16:
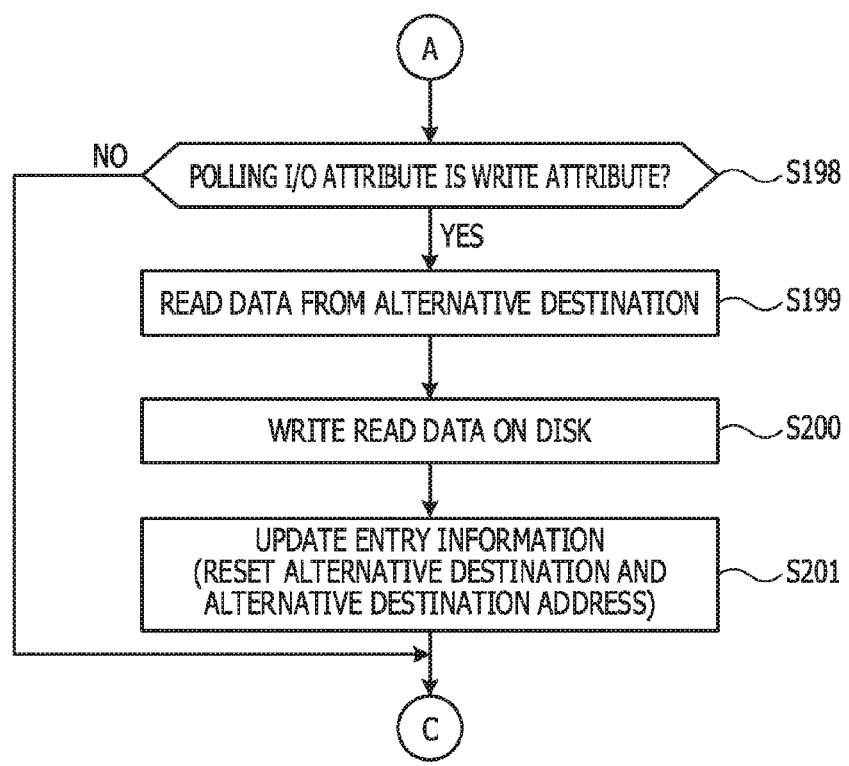
Figure 17:
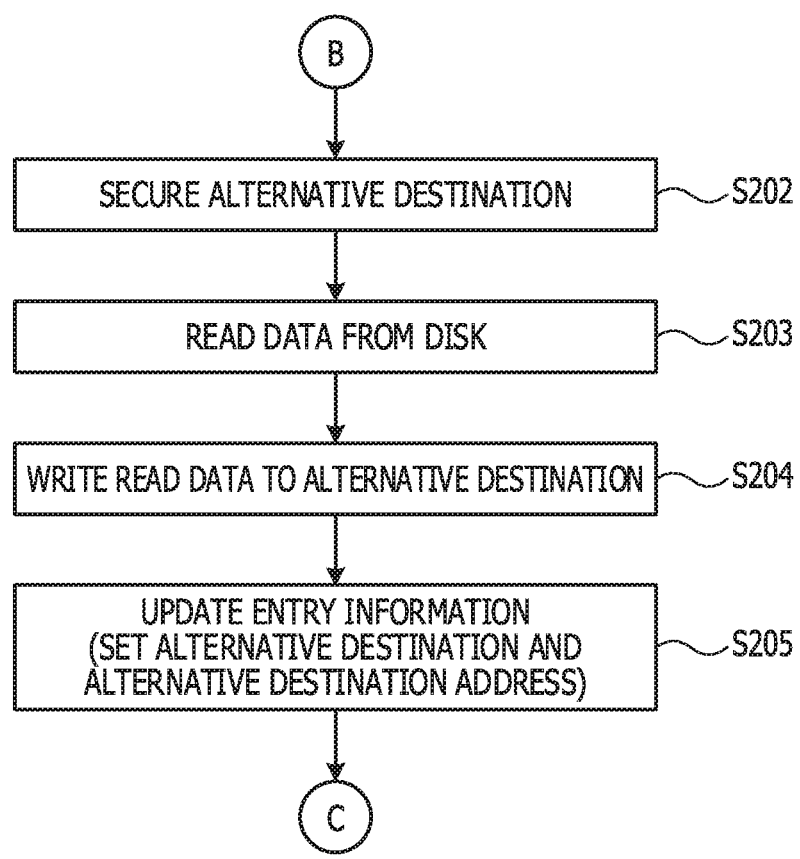

FIGS. 15, 16, and 17 illustrate motor control processing (on→off) performed by the controller according to the second embodiment.

(S191) The ECO mode control unit 123 changes, from "a motor is turned on" to "in processing for turning off a motor", the motor status of a RAID group (a RAID group serving as a target) to be caused to make a transition from the normal mode to the ECO mode.

(S192, S195) For each of the entries in the polling I/O management table, the ECO mode control unit 123 performs processing that begins from S193 and that leads to S195. In a case of finishing performing the relevant processing for all the entries existing in the polling I/O management table, the processing proceeds to S196. Hereinafter, in some case, an entry to serve as a processing target is called a target entry.

(S193) The ECO mode control unit 123 determines whether or not the target entry is an entry corresponding to a LUN of a RAID group (the self-RAID) managed by the controller 112a. In a case where the target entry is an entry corresponding to the LUN of the self-RAID, the processing proceeds to S198 in FIG. 16. On the other hand, in a case where the target entry is not an entry corresponding to the LUN of the self-RAID, the processing proceeds to S194.

(S194) The ECO mode control unit 123 determines whether or not the target entry is an entry whose alternative destination is the self-RAID. In a case where the target entry is an entry whose alternative destination is the self-RAID, the processing proceeds to S202 in FIG. 17. On the other hand, in a case where the target entry is not an entry whose alternative destination is the self-RAID, the processing proceeds to S195.

(S196) The ECO mode control unit 123 turns off the motor of the disk belonging to the RAID group serving as a target.

(S197) The ECO mode control unit 123 changes the motor status of the RAID group serving as a target from "in processing for turning off a motor" to "a motor is turned off". If the processing operation in S197 is completed, the series of processing operations illustrated in FIGS. 15 10 17 is terminated.

(S198) The ECO mode control unit 123 references the polling I/O attribute in the entry information corresponding to the target entry and determines whether or not the polling I/O attribute is a write attribute. In a case where the polling I/O attribute is a write attribute, the processing proceeds to S199. On the other hand, in a case where the polling I/O attribute is not a write attribute, the processing proceeds to S195.

(S199, S200) The ECO mode control unit 123 references the alternative destination and the alternative destination address in the entry information corresponding to the target entry and reads data existing at the alternative destination address of the alternative destination. In addition, the ECO mode control unit 123 writes the read data on the disk of the RAID group serving as a target. According to this processing, a change in data, caused by an access to the alternative destination during a time period when the RAID group serving as a target is in the ECO mode, is reflected in data of a deployment source, stored in the disk of the relevant RAID group.

(S201) The ECO mode control unit 123 resets, to states of being unspecified (see FIG. 4), the alternative destination and the alternative destination address in the entry information corresponding to the target entry. If the processing operation in S201 is completed, the processing proceeds to S195.

(S202) The ECO mode control unit 123 secures an alternative destination into which the response data is to be copied and that serves as the access destination of the polling I/O for the RAID group serving as a target.

As the alternative destination, for example, a RAID group different from the RAID group serving as a copy source, an alternative memory provided separately from a disk of a RAID group, a cache memory used as a cache, or the like only has to be used. In a case of defining the different RAID group as the alternative destination, a RAID group operating in the normal mode is a candidate for the alternative destination while the RAID group serving as the copy source is set to the ECO mode.

(S203, S204) The ECO mode control unit 123 reads data from the disk of the RAID group serving as a target. In addition, the ECO mode control unit 123 writes the read data to the alternative destination secured in S202. According to this processing, data (response data) for responding to the polling I/O for the RAID group serving as a target is copied to the alternative destination, and pseudo I/O processing based on the response data of the alternative destination is enabled during a time period when the RAID group serving as a target is in the ECO mode.

(S205) The ECO mode control unit 123 sets, as the alternative destination and the alternative destination address in the entry information corresponding to the target entry, the alternative destination and the alternative destination address into which the response data is copied. If the processing operation in S205 is completed, the processing proceeds to S195.

As described above, according to the second embodiment, by using the polling I/O management table, it is judged whether the request I/O is the polling I/O. In addition, by implementing the pseudo I/O processing in a case where the request I/O for the RAID group set to the ECO mode is the polling I/O, the setting of the ECO mode does not have to be cancelled. Therefore, a power consumption amount is suppressed. As a result, in an environment in which a server that performs monitoring processing such as device diagnostics is coupled, power consumption is more efficiently suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device configured to be coupled to a storage device including a first portion and a second portion, the storage control device comprising:
 a memory; and
 at least one processor coupled to the memory and configured to
  store, in the first portion, first data used for replying to a polling access request for monitoring the storage device,
  store, in the second portion, copied first data generated by copying the first data stored in the first portion,
  control an operation mode of the first portion of the storage device to be in a first mode and a second mode, a first power consumed by the first portion in the first mode being less than a second power consumed by the first portion in the second mode,
  set the operation mode of the first portion in the first mode,
  after the operation mode of the first portion is set in the first mode, receive a first request,
  determine whether the received first request is a polling access request for monitoring the storage device,
  when it is determined that the received first request is the polling access request, keep the operation mode of the first portion in the first mode, and read the copied first data from the second portion, and
  when it is determined that the received first request is not the polling access request, change the operation mode of the first portion to the second mode.

2. The storage control device according to claim 1, wherein the at least one processor is further configured to
 before receiving the first request, receive a second request which is the polling access request for monitoring the storage device,
 copy the first data which is stored in the first portion and is accessed by the second request, and
 store the copied first data in the second portion before receiving the first request.

3. The storage control device according to claim 1, wherein
 the first portion of the storage device is a Hard Disk Drive (HDD), and
 the second portion of the storage device is a Random Access Memory (RAM).

4. The storage control device according to claim 2, wherein
 the at least one processor is further configured to
  receive a plurality of access requests for the data by an information processing apparatus, and
  store information indicating an access request interval of the plurality of access requests from the information processing apparatus for the data, and
 the second request is determined to be the polling access request based on the access request interval.

5. The storage control device according to claim 2, wherein
 the at least one processor is further configured to
  receive an access request for the first data by an information processing apparatus, and store information indicating a size of the first data accessed by the information processing apparatus, and the second request is determined to be the polling access request based on the size of the first data.

6. The storage control device according to claim 4, wherein the second request is determined to be the polling access request when the access request interval is a fixed access interval.

7. The storage control device according to claim 5, wherein the second request is determined to be the polling access request when the size of the first data is less than a threshold value.

8. The storage control device according to claim 1, wherein the first mode is a power saving mode, and
the second mode is a normal operation mode.

9. A storage system comprising:

a storage device including a first portion and a second portion; and a control device coupled to the storage device and including a memory, and at least one processor coupled to the memory and configured to store, in the first portion, first data used for replying to a polling access request for monitoring the storage device, store, in the second portion, copied first data generated by copying the first data stored in the first portion, control an operation mode of the first portion to be in a first mode and a second mode, a first power consumed by the first portion in the first mode being less than a second power consumed by the first portion in the second mode, set the operation mode of the first portion in the first mode, after the operation mode of the first portion is set in the first mode, receive a first request, determine whether the received first request is a polling access request for monitoring the storage device, when it is determined that the received first request is the polling access request, keep the operation mode of the first portion in the first mode, and read the copied first data from the second portion, and when it is determined that the received first request is not the polling access request, change the operation mode of the first portion to the second mode.

10. The storage system according to claim 9, wherein the at least one processor is further configured to before receiving the first request, receive a second request which is the polling access request for monitoring the storage device, copy the first data which is stored in the first portion and is accessed by the second request, and store the copied first data in the second portion before receiving the first request.

11. The storage system according to claim 10, wherein the first portion of the storage device is a Hard Disk Drive (HDD), and the second portion of the storage device is a Random Access Memory (RAM).

12. The storage system according to claim 10, wherein the at least one processor is further configured to receive a plurality of access requests for the data by an information processing apparatus, and store information indicating an access request interval of the plurality of access requests from the information processing apparatus for the data, and the second request is determined to be the polling access request based on the access request interval.

13. The storage system according to claim 10, wherein the at least one processor is further configured to receive an access request for the first data by an information processing apparatus, and store information indicating a size of the first data accessed by the information processing apparatus, and the second request is determined to be the polling access request based on the size of the first data.

14. A method of controlling a storage device including a first portion and a second portion, the method comprising:

storing, in the first portion, first data used for replying to a polling access request for monitoring the storage device;

storing, in the second portion, copied first data generated by copying the first data stored in the first portion;

changing an operation mode of the first portion from a second mode to a first mode, a first power consumed by the first portion in the first mode being less than a second power consumed by the first portion in the second mode;

after the operation mode the first portion is changed to the first mode, receiving a first request;

determining whether the received first request is a polling access request for monitoring the storage device;

when it is determined that the received first request is the polling access request, keeping the operation mode of the first portion in the first mode, and reading the copied first data from the second portion; and when it is determined that the received first request is not the polling access request, change the operation mode of the first portion to the second mode.

15. The method according to claim 14, the method further comprising:

before receiving the first request, receiving a second request which is the polling access request for monitoring the storage device;

copying the first data which is stored in the first portion and is accessed by the second request; and storing the copied first data in the second portion before receiving the first request.

16. The method according to claim 14, wherein the first portion of the storage device is a Hard Disk Drive (HDD), and the second portion of the storage device is a Random Access Memory (RAM).

17. The method according to claim 15, the method further comprising:

receiving a plurality of access requests for the data by an information processing apparatus; and storing information indicating an access request interval of the plurality of access requests from the information processing apparatus for the data, wherein the second request is determined to be the polling access request based on the access request interval.

18. The method according to claim 15, the method further comprising:

receiving an access request for the second data by an information processing apparatus; and storing information indicating a size of the first data accessed by the information processing apparatus,
wherein the second request is determined to be the polling access request based on the size of the first data.

* * * * *